(12) United States Patent
Chono et al.

(10) Patent No.: US 9,532,073 B2
(45) Date of Patent: *Dec. 27, 2016

(54) VIDEO ENCODING DEVICE, VIDEO DECODING DEVICE, VIDEO DECODING METHOD, VIDEO DECODING METHOD, AND PROGRAM

(71) Applicant: NEC CORPORATION, Tokyo (JP)

(72) Inventors: Keiichi Chono, Tokyo (JP); Yuzo Senda, Tokyo (JP); Junji Tajime, Tokyo (JP); Hirofumi Aoki, Tokyo (JP); Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,181

(22) Filed: Nov. 3, 2015

(65) Prior Publication Data

US 2016/0057455 A1 Feb. 25, 2016

Related U.S. Application Data

(63) Continuation of application No. 13/695,461, filed as application No. PCT/JP2011/003927 on Jul. 8, 2011, now Pat. No. 9,210,427.

(30) Foreign Application Priority Data

Jul. 13, 2010 (JP) .................................. 2010-159059
Feb. 25, 2011 (JP) .................................. 2011-040530

(51) Int. Cl.
*H04N 7/12* (2006.01)
*H04N 19/60* (2014.01)
(Continued)

(52) U.S. Cl.
CPC .............. *H04N 19/60* (2014.11); *H04N 19/17* (2014.11); *H04N 19/182* (2014.11); *H04N 19/91* (2014.11)

(58) Field of Classification Search
CPC ........ H04N 19/91; H04N 19/40; H04N 19/10; H04N 19/12; H04N 19/44
(Continued)

(56) References Cited

U.S. PATENT DOCUMENTS 8,606,028 B2 * 12/2013 Noda ............... H04N 21/23892
382/232
8,798,149 B2 * 8/2014 Wu .......................... H04N 7/50
375/240.15
(Continued)

FOREIGN PATENT DOCUMENTS

CN 1933602 A 3/2007
CN 101106718 A 1/2008
(Continued)

OTHER PUBLICATIONS

"Information technology—Coding of audio-visual objects—"International Standard, ISO/IEC 14496-10, May 15, 2009, pp. 1-694, Fifth Edition, Part 10: Advanced Video Coding.
(Continued)

*Primary Examiner* — Gims Philippe
(74) *Attorney, Agent, or Firm* — Sughrue Mion, PLLC

(57) ABSTRACT

A video encoding device includes: pixel bit length increasing means for increasing a pixel bit length of an input image based on pixel bit length increase information; transform means for transforming output data of the pixel bit length increasing means; entropy encoding means for entropy-encoding output data of the transform means; non-compression encoding means for non-compression-encoding input data; multiplexed data selection means for selecting output (Continued)

data of the entropy encoding means or output data of the non-compression encoding means; and multiplexing means for multiplexing the pixel bit length increase information in a bitstream, wherein a pixel bit length of an image corresponding to the output data of the entropy encoding means and a pixel bit length of an image corresponding to the output data of the non-compression encoding means are different from each other.

4 Claims, 15 Drawing Sheets

(51) Int. Cl.
*H04N 19/182* (2014.01)
*H04N 19/17* (2014.01)
*H04N 19/91* (2014.01)

(58) Field of Classification Search
USPC .......................... 375/240.01–240.29
See application file for complete search history.

(56) References Cited

U.S. PATENT DOCUMENTS

| | | | |
|---|---|---|---|
| 8,923,389 B1* | 12/2014 | Hoang | H04N 19/184 375/240.02 |
| 2006/0126744 A1 | 6/2006 | Peng et al. | |
| 2007/0230572 A1 | 10/2007 | Koto et al. | |
| 2008/0012738 A1 | 1/2008 | Seki et al. | |
| 2008/0131087 A1 | 6/2008 | Lee et al. | |
| 2008/0226183 A1 | 9/2008 | Lei et al. | |
| 2008/0285864 A1 | 11/2008 | Ishikawa | |
| 2009/0087111 A1 | 4/2009 | Noda et al. | |
| 2010/0020866 A1 | 1/2010 | Marpe et al. | |
| 2010/0177820 A1 | 7/2010 | Chono et al. | |
| 2011/0249738 A1 | 10/2011 | Suzuki et al. | |
| 2012/0087411 A1* | 4/2012 | Haskell | H04N 19/61 375/240.16 |

FOREIGN PATENT DOCUMENTS

| | | |
|---|---|---|
| CN | 101411202 A | 4/2009 |
| EP | 2197215 A1 | 6/2010 |
| JP | 2004-135251 A | 4/2004 |
| JP | 2008-022383 A | 1/2008 |
| WO | 2007/116551 A1 | 10/2007 |
| WO | 2009/031648 A1 | 3/2009 |
| WO | 2010/038587 A1 | 4/2010 |

OTHER PUBLICATIONS

Chujoh Et Al.,"Internal Bit Depth Increase for Coding Efficiency",JVT Meeting May 6, 2002-May 10, 2002,6 pgs.
Communication dated Dec. 2, 2014 from the European Patent Office in conterpart application No. 11806465.8.
Communication dated Feb. 27, 2015, issued by the State Intellectual Property Office of the People's Republic of China in counterpart Application No. 201180034498.8.
NAM,"Expectations and Challenged for Next Generation Video Compression", Industrial Electronics and Application's (ICIEA), Jun. 15, 2010 pp. 2339-2344,5 Pgs., Cited in EP Comm. Dec. 2, 2014 in 11806465.8.
Reiko Noda, et al.,"Improving Video Coding Efficency by Pixel Bit-depth Increase", Forum on Information Technology 2006, 2006, pp. 207-208, J-009.
Communication from United States Patent and Trademark Office issued Apr. 12, 2016 in U.S. Appl. No. 14/931,271.
Communication from United States Patent and Trademark Office issued Apr. 22, 2016 in U.S. Appl. No. 14/931,305.
Communication dated Aug. 31, 2016 from the U.S. Patent and Trademark Office in U.S. Appl. No. 14/931,305.

* cited by examiner

FIG. 2

| seq_parameteter_set_data(){ | C | Descriptor |
|---|---|---|
| | | |
| bit_depth_luma_minus8 | 0 | ue(v) |
| bit_depth_chroma_minus8 | 0 | ue(v) |
| increased_bit_depth_luma | 0 | ue(v) |
| increased_bit_depth_chroma | 0 | ue(v) |
| ... | | |
| } | | |
| } | | |

FIG. 7

| seq_parameter_set_data(){ | C | Descriptor |
|---|---|---|
| ... | | |
| internal_bit_depth_luma_minus8 | 0 | ue(v) |
| internal_bit_depth_chroma_minus8 | 0 | ue(v) |
| ... | | |
| } | | |
| } | | |

FIG. 8

| seq_parameter_set_data(){ | C | Descriptor |
|---|---|---|
| ... | | |
| internal_bit_depth_luma_minus8 | 0 | ue(v) |
| internal_bit_depth_chroma_minus8 | 0 | ue(v) |
| ... | | |
| pcm_sample_bit_depth_is_internal_bit_depth_flag | 0 | u(1) |
| ... | | |
| } | | |
| } | | |

FIG. 9

| seq_parameter_set_data(){ | C | Descriptor |
|---|---|---|
| ... | | |
| internal_bit_depth_luma_minus8 | 0 | ue(v) |
| internal_bit_depth_chroma_minus8 | 0 | ue(v) |
| ... | | |
| pcm_sample_bit_depth_luma_minus8 | 0 | ue(V) |
| pcm_sample_bit_depth_chroma_minus8 | 0 | ue(V) |
| ... | | |
| } | | |
| } | | |

Intra_16 x 16

2: DC(MEAN), 3: Plane(PLANE)

PREDICTION DIRECTION

VIDEO ENCODING DEVICE, VIDEO DECODING DEVICE, VIDEO DECODING METHOD, VIDEO DECODING METHOD, AND PROGRAM

CROSS REFERENCE TO RELATED APPLICATIONS

This application is Continuation application of U.S. patent application Ser. No. 13/695,461, filed on Jan. 10, 2013, which is a National Stage of International Application No. PCT/JP2011/003927 filed Jul. 8, 2011, claiming priority based on Japanese Patent Application Nos. 2010-159059, filed Jul. 13, 2010 and 2011-040530 filed Feb. 25, 2011, the contents of all of which are incorporated herein by reference in their entirety.

TECHNICAL FIELD

The present invention relates to a video encoding device and a video decoding device that use pixel bit length increase and non-compression encoding.

BACKGROUND ART

As a video encoding scheme intended for high-efficiency transmission and accumulation of video information, an encoding scheme of the ISO/IEC 14496-10 Advanced Video Coding (AVC) standard is described in Non Patent Literature (NPL) 2. Moreover, NPL 1 proposes improvement in compression efficiency of video encoding, by extending (increasing) a pixel bit length of an input image upon video encoding to enhance operation precision of intra prediction and motion-compensated prediction (inter-frame prediction).

Patent Literature (PTL) 1 proposes switching between entropy encoding and non-compression encoding (PCM encoding) per predetermined encoded unit, to guarantee a fixed processing time for a video encoding device or a video decoding device.

CITATION LIST

Patent Literature

PTL 1: Japanese Patent Application Laid-Open No. 2004-135251

Non Patent Literature

NPL 1: Reiko Noda, Takeshi Chujoh "Improving Video Coding Efficiency by Pixel Bit-depth Increase", Forum on Information Technology 2006, J-009, 2006
NPL 2: ISO/IEC 14496-10 Advanced Video Coding

SUMMARY OF INVENTION

Technical Problem

FIG. 16 is a block diagram showing a video encoding device obtained by simply combining the technique described in NPL 1 and the technique described in PTL 1. Hereafter, the video encoding device shown in FIG. 16 is referred to as a typical video encoding device.

A structure and an operation of the typical video encoding device that receives input of each frame of digitized video and outputs a bitstream are described below, with reference to FIG. 16.

The video encoding device shown in FIG. 16 includes a pixel bit length increasing unit 101, a transformer/quantizer 102, an entropy encoder 103, an inverse transformer/inverse quantizer 104, a buffer 105, a predictor 106, a PCM encoder 107, a PCM decoder 108, a multiplexed data selector 109, a multiplexer 110, a switch 121, and a switch 122.

The video encoding device shown in FIG. 16 divides each frame into blocks of 16×16 pixel size called macroblocks (MBs), and encodes each MB sequentially from top left of the frame. In AVC described in NPL 2, each MB is further divided into blocks of 4×4 pixel size, and each block of 4×4 pixel size is encoded.

FIG. 17 is an explanatory diagram showing an example of block division in the case where the frame has a spatial resolution of QCIF (Quarter Common Intermediate Format). The following describes an operation of each component by focusing only on pixel values of luminance, for simplicity's sake.

The pixel bit length increasing unit 101 increases a pixel bit length of the block-divided input video, based on pixel bit length increase information set from outside. Let bit_depth_luma be the pixel bit length of the input video, and increased_bit_depth_luma be the pixel bit length increase information (increased pixel bit length). The pixel bit length increasing unit 101 shifts each pixel value of the input video to the left by increased_bit_depth_luma bits. As a result, the output data of the pixel bit length increasing unit 101 has a pixel bit length of bit_depth_luma+increased_bit_depth_luma bits.

A prediction signal supplied from the predictor 106 is subtracted from the image increased in pixel bit length which is output from the pixel bit length increasing unit 101, and the resulting image is input to the transformer/quantizer 102. There are two types of prediction signal, namely, an intra prediction signal and an inter-frame prediction signal. Each of the prediction signals is described below.

The intra prediction signal is a prediction signal created based on an image of a reconstructed picture that has the same display time as a current picture and is stored in the buffer 105. Referring to 8.3.1 Intra_4×4 prediction process for luma sample, 8.3.2 Intra_8×8 prediction process for luma samples, and 8.3.3 Intra_16×16 prediction process for luma samples in NPL 2, intra prediction modes of three block sizes, i.e. Intra_4×4, Intra_8×8, and Intra_16×16, are available for intra prediction.

As can be understood from FIGS. 18(A) and 18(C), Intra_4×4 and Intra_8×8 are respectively intra prediction of 4×4 block size and 8×8 block size. Each circle (○) in FIGS. 18(A) and 18(C) indicates a reference pixel used for intra prediction, i.e. a pixel of the reconstructed picture having the same display time as the current picture.

In intra prediction of Intra_4×4, reconstructed peripheral pixels are directly set as reference pixels, and used for padding (extrapolation) in nine directions shown in FIG. 18(B) to form the prediction signal. In intra prediction of Intra_8×8, pixels obtained by smoothing peripheral pixels of the image of the reconstructed picture by low-pass filters (½, ¼, ½) shown under the right arrow in FIG. 18(C) are set as reference signals, and used for extrapolation in the nine directions shown in FIG. 18(B) to form the prediction signal.

As shown in FIG. 19(A), Intra_16×16 is intra prediction of 16×16 block size. Each circle (○) in FIG. 19(A) indicates a reference pixel used for intra prediction, i.e. a pixel of the reconstructed picture having the same display time as the current picture, as in the example shown in FIGS. 18(A), 18(B) and 18(C). In intra prediction of Intra_16×16, peripheral pixels of the reconstructed image are directly set as reference pixels, and used for extrapolation in four directions shown in FIG. 19(B) to form the prediction signal.

Hereafter, an MB encoded using the intra prediction signal is referred to as an intra MB, a block size of intra prediction is referred to as an intra prediction mode, and a direction of extrapolation is referred to as an intra prediction direction.

The inter-frame prediction signal is a prediction signal created from an image of a reconstructed picture that has a different display time from the current picture and is stored in the buffer 105. Hereafter, an MB encoded using the inter-frame prediction signal is referred to as an inter MB. A block size of the inter MB can be selected from, for example, 16×16, 16×8, 8×16, 8×8, 8×4, 4×8, and 4×4.

FIG. 20 is an explanatory diagram showing an example of inter-frame prediction using 16×16 block size as an example. A motion vector MV=($mv_x$, $mv_y$) shown in FIG. 20 is one of prediction parameters of inter-frame prediction, which indicates the amount of translation of an inter-frame prediction block (inter-frame prediction signal) of a reference picture relative to a block to be encoded. In AVC, the prediction parameters of inter-frame prediction include not only an inter-frame prediction direction representing a direction of the reference picture of the inter-frame prediction signal relative to a picture to be encoded of the block to be encoded, but also a reference picture index for identifying the reference picture used for inter-frame prediction of the block to be encoded. This is because, in AVC, a plurality of reference pictures stored in the buffer 105 can be used for inter-frame prediction.

Inter-frame prediction is described in more detail in 8.4 Inter prediction process in NPL 2.

Hereafter, an MB encoded using the inter-frame prediction signal is referred to as an inter MB, a block size of inter-frame prediction is referred to as an inter prediction mode, and a direction of inter-frame prediction is referred to as an inter prediction direction.

A picture encoded including only intra MBs is called an I picture. A picture encoded including not only intra MBs but also inter MBs is called a P picture. A picture encoded including inter MBs that use not only one reference picture but two reference pictures simultaneously for inter-frame prediction is called a B picture. In the B picture, inter-frame prediction in which the direction of the reference picture of the inter-frame prediction signal relative to the picture to be encoded of the block to be encoded is to the past is called forward prediction, inter-frame prediction in which the direction of the reference picture of the inter-frame prediction signal relative to the picture to be encoded of the block to be encoded is to the future is called backward prediction, and inter-frame prediction involving both the past and the future is called bidirectional prediction.

The transformer/quantizer 102 frequency-transforms the image increased in pixel bit length from which the prediction signal has been subtracted (prediction error image).

The transformer/quantizer 102 further quantizes the frequency-transformed prediction error image (frequency transform coefficient), with a quantization step width Qs according to the increased pixel bit length increased_bit_depth_luma of the pixel bit length increasing unit 101. Let $Qs_{luma}$ be a normal quantization step width. Then, $Qs=Qs_{luma}*2^{increased\_bit\_depth\_luma}$, as an example. Hereafter, the quantized frequency transform coefficient is referred to as a transform quantization value.

The entropy encoder 103 entropy-encodes prediction parameters and the transform quantization value. The prediction parameters are information related to MB prediction, such as intra MB/inter MB, intra prediction mode, intra prediction direction, inter MB block size, and motion vector mentioned above.

The inverse transformer/inverse quantizer 104 inverse-quantizes the transform quantization value, with the quantization step width according to the increased pixel bit length increased_bit_depth_luma of the pixel bit length increasing unit 101. The inverse transformer/inverse quantizer 104 further inverse-frequency-transforms the frequency transform coefficient obtained by the inverse quantization. The prediction signal is added to the reconstructed prediction error image obtained by the inverse frequency transform, and the resulting image is supplied to the switch 122.

The multiplexed data selector 109 monitors the amount of input data per predetermined encoded unit (e.g. macroblock) to the entropy encoder 103. In the case where the entropy encoder 103 is capable of entropy-encoding the input data within a processing time corresponding to the predetermined encoded unit, the multiplexed data selector 109 controls the switch 121 to select the output data of the entropy encoder 103. As a result, the output data of the entropy encoder 103 is supplied to the multiplexer 110 via the switch 121. The multiplexed data selector 109 further controls the switch 122 to select the output data of the inverse transformer/inverse quantizer 104. As a result, the output data of the inverse transformer/inverse quantizer 104 is supplied to the buffer 105 via the switch 122.

In the case where the entropy encoder 103 is not capable of entropy-encoding the input data within the processing time, the multiplexed data selector 109 controls the switch 121 to select the output data of the PCM encoder 107 obtained by PCM-encoding the output data of the pixel bit length increasing unit 101. As a result, the output data of the PCM encoder 107 is supplied to the multiplexer 110 via the switch 121. The multiplexed data selector 109 further controls the switch 122 to select the output data of the PCM decoder 108 obtained by PCM-decoding the output data of the PCM encoder 107. As a result, the output data of the PCM decoder 108 is supplied to the buffer 105 via the switch 122.

The buffer 105 stores the reconstructed image supplied via the switch 122. The reconstructed image per frame is referred to as a reconstructed picture.

The multiplexer 110 multiplexes the pixel bit length increase information with the output data of the entropy encoder 103 and the output data of the PCM encoder 107, and outputs the multiplexing result.

Based on the operation described above, the typical video encoding device creates the bitstream.

In the case of using the typical technique described above, it is possible to both enhance operation precision of intra prediction or inter-frame prediction by pixel bit length extension and guarantee a fixed processing time for a video encoding device or a video decoding device.

However, in the typical technique described above, the image increased in pixel bit length is PCM-encoded, which causes a problem that output data of PCM encoding increases by the pixel bit length increase amount despite a lack of PSNR (Peak Signal to Noise Ratio) improvement. For example, in the case where bit_depth_luma is 8 bits and increased_bit_depth_luma is 8 bits, the output data of PCM encoding is 16 bits, which is twice as large as the 8-bit input image.

In view of this, the present invention has an object of suppressing increase of output data of PCM encoding, in video encoding based on pixel bit length increase and PCM encoding.

Solution to Problem

A video encoding device according to the present invention includes: pixel bit length increasing means for increasing a pixel bit length of an input image based on pixel bit length increase information; transform means for transforming output data of the pixel bit length increasing means; entropy encoding means for entropy-encoding output data of the transform means; non-compression encoding means for non-compression-encoding input data; multiplexed data selection means for selecting output data of the entropy encoding means or output data of the non-compression encoding means; and multiplexing means for multiplexing the pixel bit length increase information in a bitstream, wherein a pixel bit length of an image corresponding to the output data of the entropy encoding means and a pixel bit length of an image corresponding to the output data of the non-compression encoding means are different from each other.

A video decoding device according to the present invention includes: de-multiplexing means for de-multiplexing a bitstream including at least pixel bit length increase information; entropy decoding means for entropy-decoding transformed data of an image included in the bitstream; inverse transform means for inverse-transforming the entropy-decoded transformed data of the image; non-compression decoding means for non-compression-decoding non-compression-encoded data of an image included in the bitstream; and decoding control means for controlling the entropy decoding means and the non-compression decoding means, wherein a pixel bit length of an image corresponding to input data of the entropy decoding means and a pixel bit length of an image corresponding to input data of the non-compression decoding means are different from each other.

A video encoding method according to the present invention includes: transforming data obtained by increasing a pixel bit length of an input image based on pixel bit length increase information; entropy-encoding the transformed data; non-compression-encoding input data; selecting the entropy-encoded data or the non-compression-encoded data; and multiplexing the pixel bit length increase information in a bitstream, wherein a pixel bit length of an image corresponding to the entropy-encoded data and a pixel bit length of an image corresponding to the non-compression-encoded data are different from each other.

A video decoding method according to the present invention includes: de-multiplexing a bitstream including at least pixel bit length increase information; entropy-decoding transformed data of an image included in the bitstream; inverse-transforming the entropy-decoded transformed data of the image; and non-compression-decoding non-compression-encoded data of an image included in the bitstream, wherein a pixel bit length of an image corresponding to the transformed data of the image included in the bitstream and a pixel bit length of an image corresponding to the non-compression-encoded data of the image included in the bitstream are different from each other.

A video encoding program according to the present invention causes a computer to execute: a process of transforming data obtained by increasing a pixel bit length of an input image based on pixel bit length increase information; a process of entropy-encoding the transformed data; a process of non-compression-encoding input data; a process of selecting the entropy-encoded data or the non-compression-encoded data; and a process of multiplexing the pixel bit length increase information in a bitstream, wherein a pixel bit length of an image corresponding to the entropy-encoded data and a pixel bit length of an image corresponding to the non-compression-encoded data are different from each other.

A video decoding program according to the present invention causes a computer to execute: a process of de-multiplexing a bitstream including at least pixel bit length increase information; a process of entropy-decoding transformed data of an image included in the bitstream; a process of inverse-transforming the entropy-decoded transformed data of the image; and a process of non-compression-decoding non-compression-encoded data of an image included in the bitstream, wherein a pixel bit length of an image corresponding to the transformed data of the image included in the bitstream and a pixel bit length of an image corresponding to the non-compression-encoded data of the image included in the bitstream are different from each other.

Advantageous Effects of Invention

According to the present invention, it is possible to suppress increase of output data of PCM encoding, in video encoding based on pixel bit length increase and PCM encoding.

BRIEF DESCRIPTION OF DRAWINGS

FIG. 2 is an explanatory diagram showing pixel bit length increase information in sequence parameters.

FIG. 7 is an explanatory diagram showing another example of pixel bit length increase information in sequence parameters.

FIG. 8 is an explanatory diagram showing yet another example of pixel bit length increase information in sequence parameters.

FIG. 9 is an explanatory diagram showing yet another example of pixel bit length increase information in sequence parameters.

DESCRIPTION OF EMBODIMENTS

Exemplary Embodiment 1

A video encoding device in this exemplary embodiment includes: means for making a pixel bit length of an image corresponding to output data of entropy encoding and a pixel bit length of an image corresponding to output data of PCM encoding different from each other; means for increasing a pixel bit length of a decoded image of PCM decoding based on pixel bit length increase information; and means for multiplexing the pixel bit length increase information in a bitstream.

Figure 1:
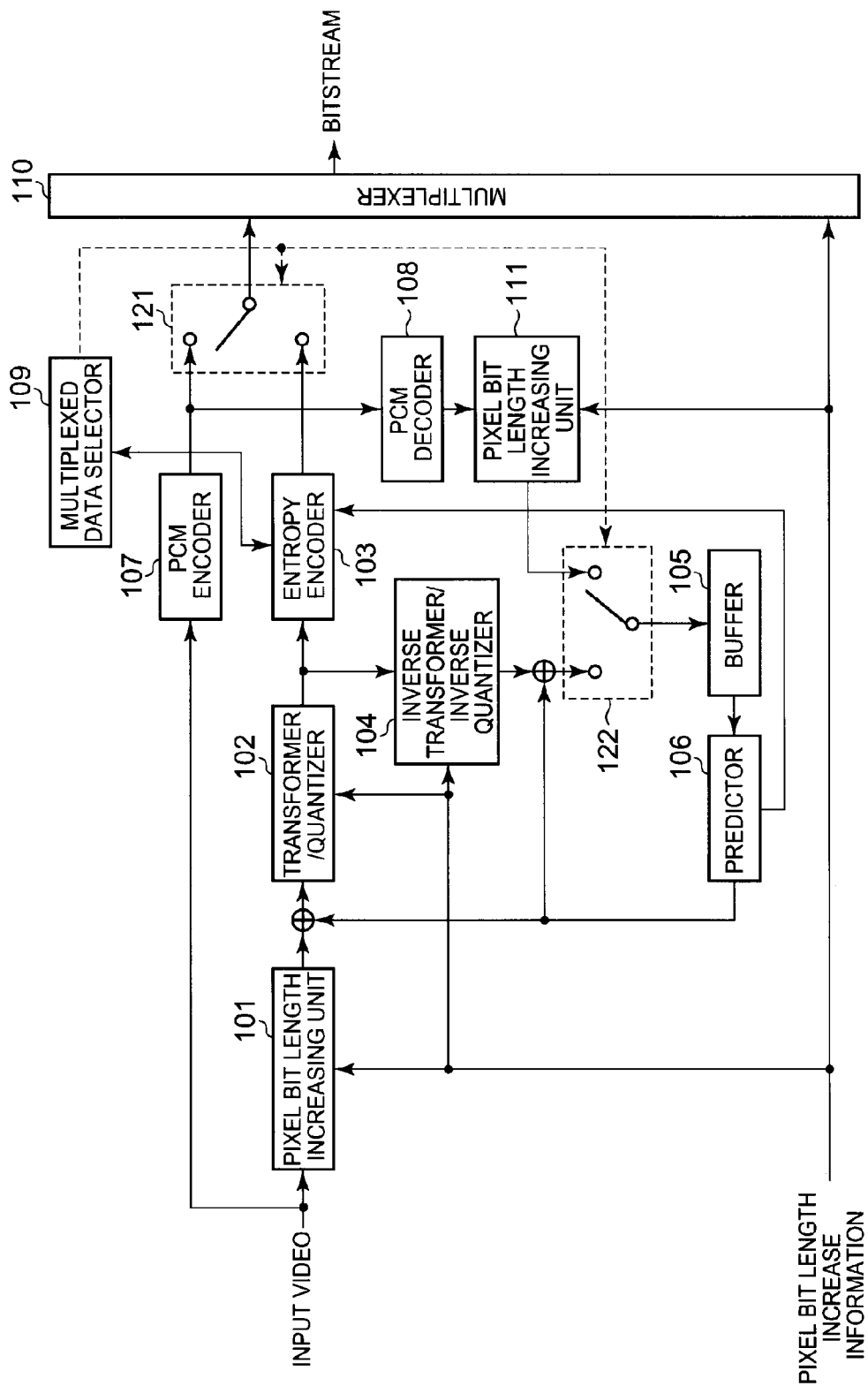
FIG. 1 is a block diagram of a video encoding device in Exemplary Embodiment 1.
Figure 16:
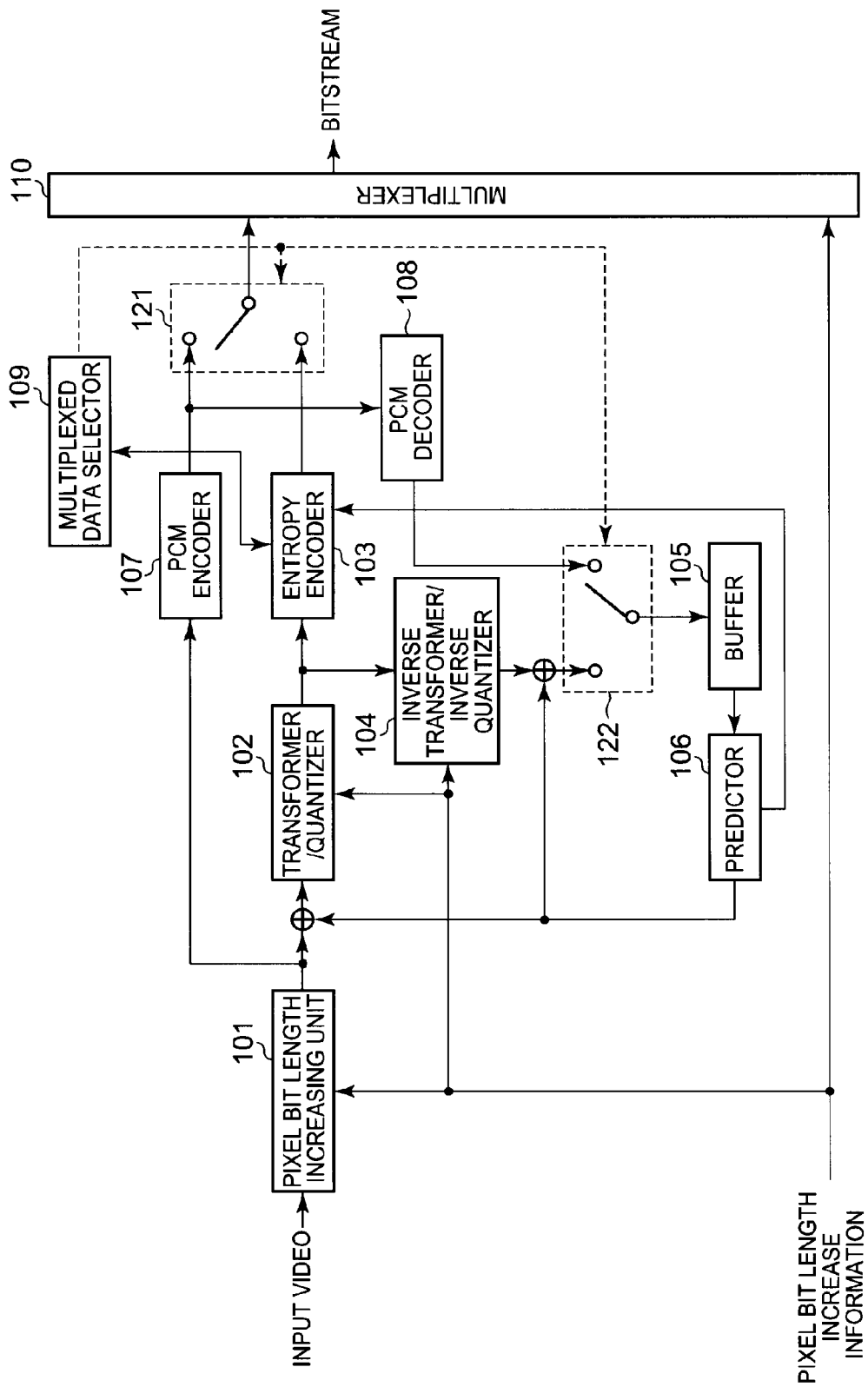
FIG. 16 is a block diagram showing a typical video encoding device.
Figure 17:
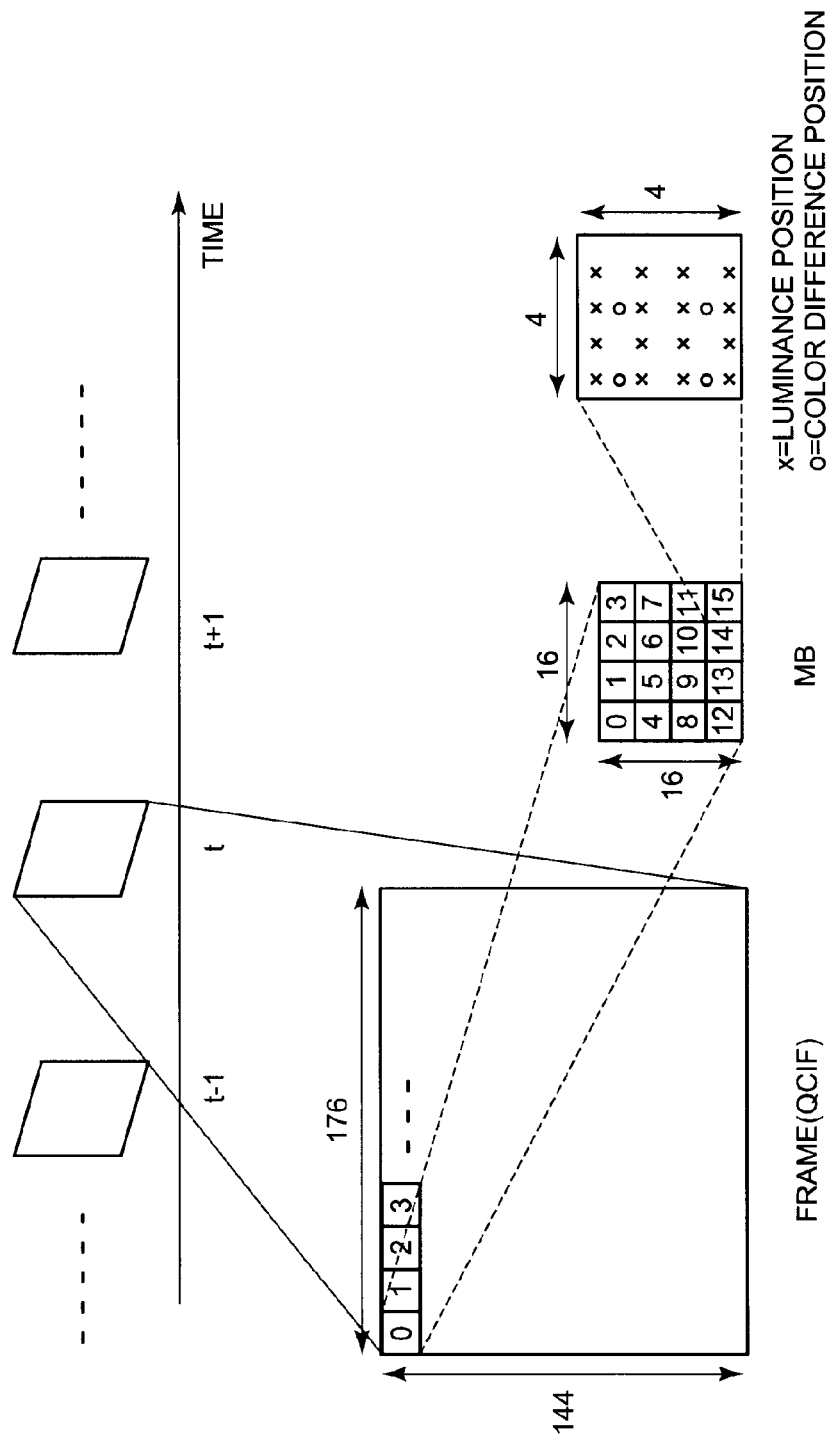
FIG. 17 is an explanatory diagram showing an example of block division.
Figure 18A:
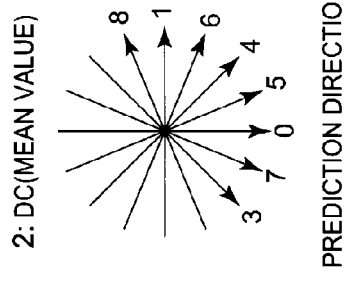
FIGS. 18(A), 18(B) and 18(C) are explanatory diagrams showing prediction types.
Figure 18B:
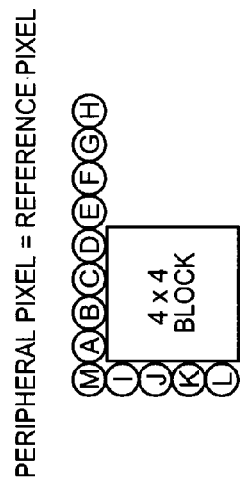
Figure 18C:
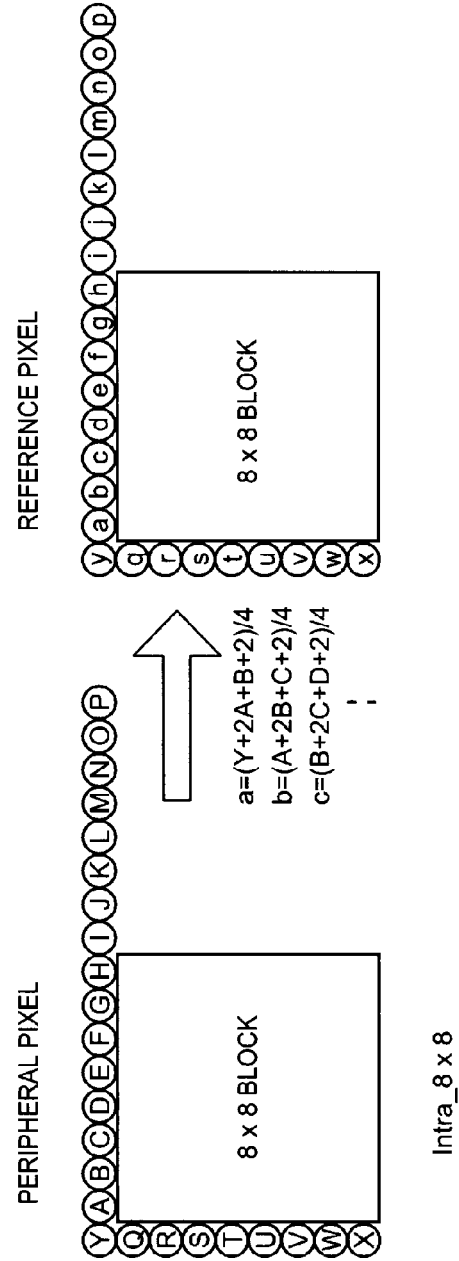
Figure 19A:
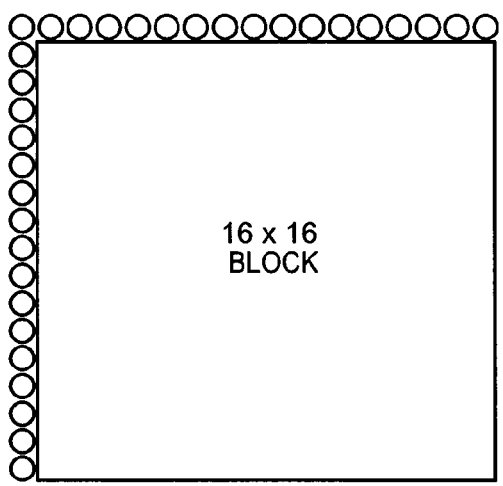
FIGS. 19(A) and 19(B) are an explanatory diagrams showing prediction types.
Figure 19B:
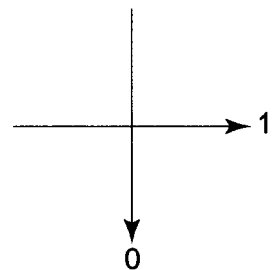
Figure 20:
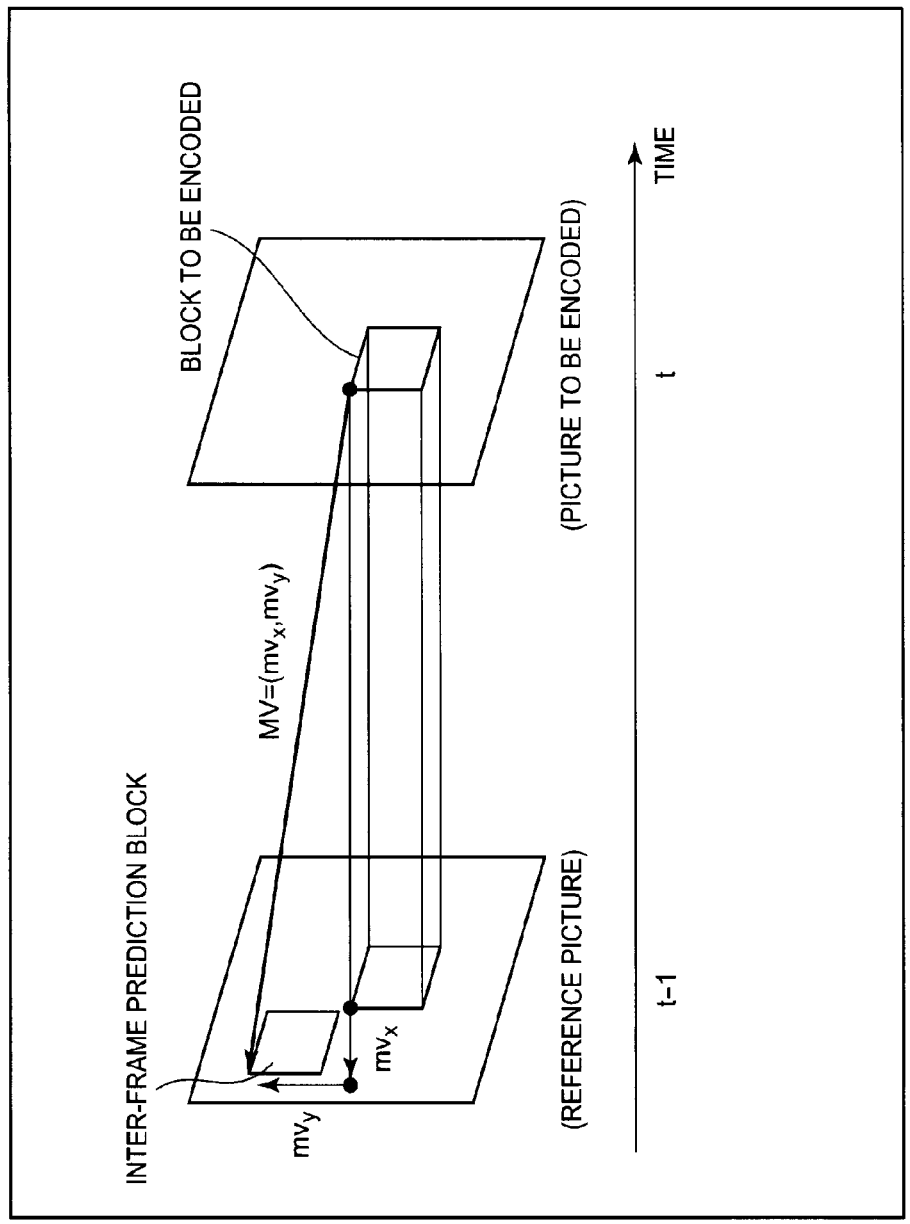
FIG. 20 is an explanatory diagram showing an example of inter-frame prediction using 16×16 block size as an example.

As shown in FIG. 1, the video encoding device in this exemplary embodiment includes a pixel bit length increasing unit 111 for increasing a pixel bit length of a decoded image of the PCM decoder 108 based on pixel bit length increase information, in addition to the pixel bit length increasing unit 101, the transformer/quantizer 102, the entropy encoder 103, the inverse transformer/inverse quantizer 104, the buffer 105, the predictor 106, the PCM encoder 107, the PCM decoder 108, the multiplexed data selector 109, the multiplexer 110, the switch 121, and the switch 122 included in the typical video encoding device shown in FIG. 16.

When comparing FIGS. 1 and 16, it can be understood that the video encoding device in this exemplary embodiment supplies an input image before pixel bit length increase to the PCM encoder 107, in order to make a pixel bit length of an image corresponding to output data of entropy encoding and a pixel bit length of an image corresponding to output data of PCM encoding different from each other. The image corresponding to the output data of entropy encoding is an image of input video increased in pixel bit length which is supplied to the transformer/quantizer 102, and a reconstructed image of the image of the input video increased in pixel bit length which is supplied from the inverse transformer/inverse quantizer 104. The image corresponding to the output data of PCM encoding is an image of input video not increased in pixel bit length which is supplied to the PCM encoder 107, and a PCM-decoded image of the input video not increased in pixel bit length which is supplied from the PCM decoder 108.

The pixel bit length increasing unit 101 increases a pixel bit length of block-divided input video, based on pixel bit length increase information set from outside.

Let bit_depth_luma be a pixel bit length of luminance of the input video, and increased_bit_depth_luma be pixel bit length increase information of luminance (increased pixel bit length). The pixel bit length increasing unit 101 shifts each pixel value of luminance of the input video to the left by increased_bit_depth_luma bits. As a result, the output data of the pixel bit length increasing unit 101 has a pixel bit length of bit_depth_luma+increased_bit_depth_luma bits. Likewise, for color difference (Cb and Cr components), let bit_depth_chroma be a pixel bit length of color difference of the input video, and increased_bit_depth_chroma be pixel bit length increase information of color difference. The pixel bit length increasing unit 101 shifts each pixel value of color difference of the input video to the left by increased_bit_depth_luma bits.

A prediction signal supplied from the predictor 106 is subtracted from the image increased in pixel bit length which is output from the pixel bit length increasing unit 101, and the resulting image is input to the transformer/quantizer 102. The transformer/quantizer 102 frequency-transforms the image increased in pixel bit length from which the prediction signal has been subtracted (prediction error image).

The transformer/quantizer 102 further quantizes the frequency-transformed prediction error image (frequency transform coefficient), with a quantization step width Qs according to the increased pixel bit lengths increased_bit_depth_luma and increased_bit_depth_chroma of the pixel bit length increasing unit 101. Let $Qs_{luma}$ be a normal quantization step width of luminance. Then, $Qs = Qs_{luma} * 2^{increased\_bit\_depth\_luma}$, as an example. Hereafter, the quantized frequency transform coefficient is referred to as a transform quantization value.

The entropy encoder 103 entropy-encodes prediction parameters supplied from the predictor 106 and the transform quantization value supplied from the transformer/quantizer 102. The prediction parameters are information related to macroblock prediction, such as intra MB/inter MB, intra prediction mode, intra prediction direction, inter MB block size, and motion vector.

The inverse transformer/inverse quantizer 104 inverse-quantizes the transform quantization value, with the quantization step width according to the increased pixel bit lengths increased_bit_depth_luma and increased_bit_depth_chroma of the pixel bit length increasing unit 101. The inverse transformer/inverse quantizer 104 further inverse-frequency-transforms the frequency transform coefficient obtained by the inverse quantization. The prediction signal is added to the reconstructed prediction error image obtained by the inverse frequency transform, and the resulting image is supplied to the switch 122.

The PCM encoder 107 PCM-encodes the input image before the increase of the pixel bit length. Output data pcm_sample_luma[i] of luminance of the PCM encoder 107 has the pixel bit length bit_depth_luma of luminance of the input video. Here, i (0≤i≤255) is an index in raster scan order within the macroblock. Likewise, output data pcm_sample_chroma[i] (i: 0≤i≤127) of color difference of the PCM encoder 107 has the pixel bit length bit_depth_chroma of color difference of the input video.

The PCM decoder 108 PCM-decodes pcm_sample_luma[i] and pcm_sample_chroma[i]. Hereafter, PCM decoding is also referred to as PCM data reading.

The pixel bit length increasing unit 111 shifts PCM-data-read pcm_sample_luma[i] to the left by increased_bit_depth_luma bits. As a result, a reconstructed image obtained via the PCM decoder 108 has bit_depth_luma+increased_bit_depth_luma bits, and is supplied to the switch 122. Likewise, PCM-data-read pcm_sample_chroma[i] is shifted to the left by increased_bit_depth_chroma bits, and supplied to the switch 122.

The multiplexed data selector 109 monitors the amount of input data per predetermined encoded unit (e.g. macroblock) to the entropy encoder 103. In the case where the entropy encoder 103 is capable of entropy-encoding the input data within a processing time corresponding to the predetermined encoded unit, the multiplexed data selector 109 controls the switch 121 to select the output data of the entropy encoder 103. As a result, the output data of the entropy encoder 103 is supplied to the multiplexer 110 via the switch 121. The multiplexed data selector 109 further controls the switch 122 to select the output data of the inverse transformer/inverse quantizer 104. As a result, the output data of the inverse transformer/inverse quantizer 104 is supplied to the buffer 105 via the switch 122.

In the case where the entropy encoder 103 is not capable of entropy-encoding the input data within the processing time, the multiplexed data selector 109 first causes the entropy encoder 103 to encode and output information indicating that the macroblock is an intra MB of PCM. In detail, when complying with 7.3.5 Macroblock layer syntax in NPL 2, mb_type is entropy-encoded and output as I_PCM.

Following this, the output bit of the entropy encoder 103 is byte-aligned. In detail, when complying with 7.3.5 Macroblock layer syntax in NPL 2, the entropy encoder 103 supplies a predetermined number of pcm_alignment_zero_bit to the multiplexer 110. Moreover, the entropy encoder 103 initializes an encoding engine, for subsequent encoding.

An example of encoding engine initialization is described in 9.3.4.1 Initialization process for the arithmetic encoding engine (informative) in NPL 2.

The multiplexed data selector 109 further controls the switch 121 to select the output data of the PCM encoder 107. As a result, the output data of the PCM encoder 107 is supplied to the multiplexer 110 via the switch 121.

Lastly, the multiplexed data selector 109 controls the switch 122 to select the output data of the pixel bit length increasing unit 111. As a result, the output data of the pixel bit length increasing unit 111 is supplied to the buffer 105 via the switch 122. Here, the pixel bit length increasing unit 111 increases the number of bits by shifting, to the left by increased_bit_depth_luma bits, the output data pcm_sample_luma[i] of the PCM decoder 108 obtained by reading the output data pcm_sample_luma[i] of the PCM encoder 107. Likewise, the pixel bit length increasing unit 111 increases the number of bits by shifting, to the left by increased_bit_depth_chroma bits, the output data pcm_sample_chroma[i] of the PCM decoder 108 obtained by reading the output data pcm_sample_chroma[i] of the PCM encoder 107.

The multiplexer 110 multiplexes the pixel bit length increase information with the output data of the entropy encoder 103 and the output data of the PCM encoder 107, and outputs the multiplexing result. When complying with Specification of syntax functions, categories, and descriptors in NPL 2, the pixel bit length increase information (increased_bit_depth_luma and increased_bit_depth_chroma) may be multiplexed following bit_depth_luma_minus8 and bit_depth_chroma_minus8 of sequence parameters, as in the list shown in FIG. 2. Here, bit_depth_luma_minus8 is a value obtained by subtracting 8 from the pixel bit length bit_depth_luma of luminance of the input video, bit_depth_chroma_minus8 is a value obtained by subtracting 8 from the pixel bit length bit_depth_chroma of color difference of the input video, increased_bit_depth_luma is the increased pixel bit length of luminance, and increased_bit_depth_chroma is the increased pixel bit length of color difference.

The expressions ("C" and "Descriptor") in the list shown in FIG. 2 are, for example, in compliance with 7.2 Specification of syntax functions, categories, and descriptors in NPL 2.

Based on the operation described above, the video encoding device in this exemplary embodiment creates the bitstream.

Operations of the entropy encoder 103, the PCM encoder 107, the PCM decoder 108, and the pixel bit length increasing unit 111 in the case of not being capable of entropy-encoding within the processing time, which are features of the present invention, are described below with reference to the flowchart in FIG. 3.

Figure 3:
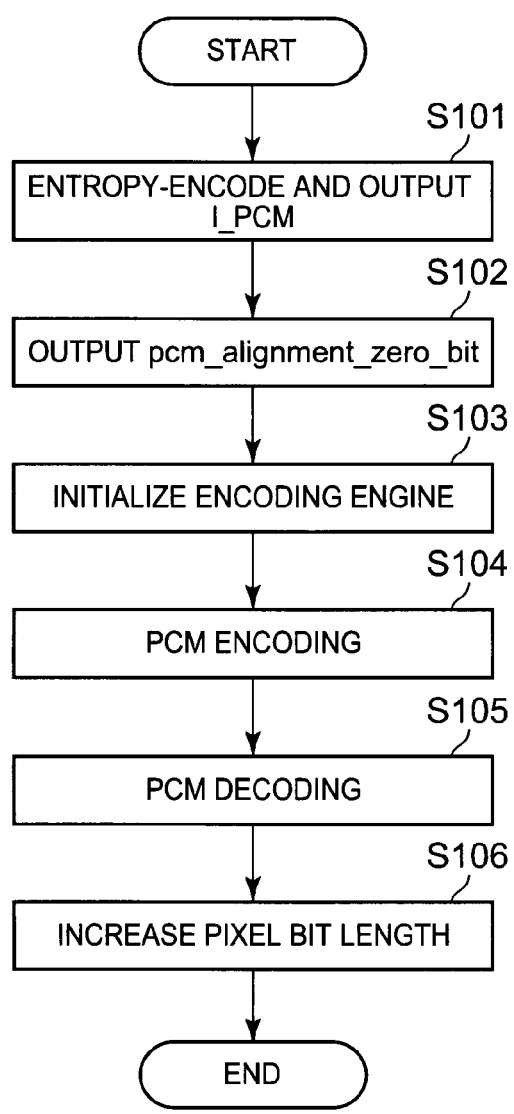
FIG. 3 is a flowchart showing processing of the video encoding device in Exemplary Embodiment 1.

As shown in FIG. 3, in step S101, the entropy encoder 103 entropy-encodes mb_type as I_PCM and supplies it to the multiplexer 110, in order to guarantee a fixed processing time for a video encoding device or a video decoding device.

In step S102, the entropy encoder 103 supplies pcm_alignment_zero_bit to the multiplexer 110, to byte-align the output bit.

In step S103, the entropy encoder 103 initializes the encoding engine for subsequent entropy encoding.

In step S104, the PCM encoder 107 PCM-encodes the input image before the increase of the pixel bit length and supplies it to the multiplexer 110, so as not to increase output data of PCM encoding.

In step S105, the PCM decoder 108 PCM-decodes (PCM-data-reads) the PCM encoding result pcm_sample_luma[i] and pcm_sample_chroma[i].

In step S106, the pixel bit length increasing unit 111 shifts pcm_sample_luma[i] and pcm_sample_chroma[i] PCM-data-read by the PCM decoder 108 to the left respectively by increased_bit_depth_luma bits and increased_bit_depth_chroma bits, in order to enhance operation precision of subsequent intra prediction and inter-frame prediction.

Thus, in the case of not being capable of entropy-encoding within the processing time corresponding to the predetermined encoded unit, the entropy encoder 103 and the PCM encoder 107 operate as described above.

In the video encoding device in this exemplary embodiment, the input image before the increase of the pixel bit length is supplied to the PCM encoder 107, in order to make the pixel bit length of the image corresponding to the output data of entropy encoding and the pixel bit length of the image corresponding to the output data of PCM encoding different from each other. Such a structure enables suppression of increase of output data of PCM encoding, in video encoding based on pixel bit length increase and non-compression encoding.

Moreover, the video encoding device in this exemplary embodiment includes the pixel bit length increasing unit 111 for increasing the pixel bit length of the decoded image of PCM decoding based on the pixel bit length increase information. The pixel bit length increasing unit 111 can suppress reduction of operation precision of intra prediction and inter-frame prediction caused by making the pixel bit lengths different from each other.

Furthermore, in the video encoding device in this exemplary embodiment, the multiplexer 110 multiplexes the pixel bit length increase information in the bitstream so that the pixel bit length of the decoded image of PCM decoding is equally increased in video decoding. Such a structure contributes to enhanced interoperability of the video encoding device and the video decoding device. That is, the video encoding device and the video decoding device co-operate with each other, with it being possible to suppress increase of PCM encoding in the system and also suppress reduction of operation precision of intra prediction and inter-frame prediction.

Exemplary Embodiment 2

A video decoding device in this exemplary embodiment decodes a bitstream in which a pixel bit length of an image corresponding to input data of entropy decoding means and a pixel bit length of an image corresponding to input data of PCM decoding means are different from each other. The image corresponding to the input data of the entropy decoding means is a reconstructed image of an image of input video increased in pixel bit length which is supplied from an inverse transformer/inverse quantizer 206 described later. The image corresponding to the input data of the PCM decoding means is a PCM-decoded image of input video not increased in pixel bit length which is supplied from a PCM decoder 203 described later.

Figure 4:
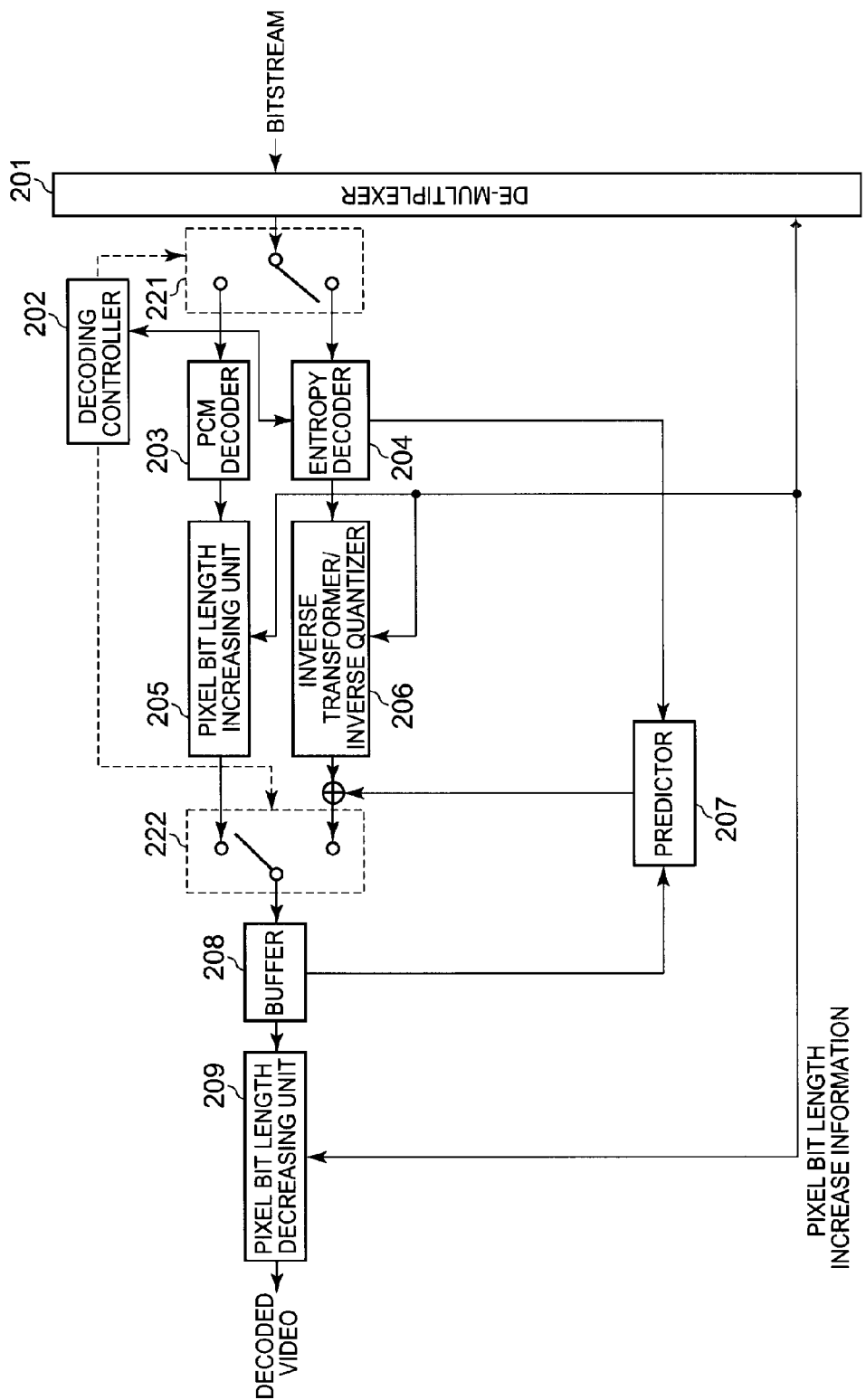
FIG. 4 is a block diagram of a video decoding device in Exemplary Embodiment 2.

As shown in FIG. 4, the video decoding device in this exemplary embodiment includes a de-multiplexer 201, a decoding controller 202, the PCM decoder 203, an entropy decoder 204, a pixel bit length increasing unit 205, the inverse transformer/inverse quantizer 206, a predictor 207, a buffer 208, a pixel bit length decreasing unit 209, a switch 221, and a switch 222.

The de-multiplexer 201 de-multiplexes an input bitstream, to extract pixel bit length increase information and an entropy-encoded or PCM-encoded video bitstream. When complying with Specification of syntax functions, categories, and descriptors in NPL 2, the pixel bit length increase information (increased_bit_depth_luma and increased_bit_depth_chroma) following bit_depth_luma_minus8 and bit_depth_chroma_minus8 of the sequence parameters as in the list shown in FIG. 2 is extracted.

The entropy decoder 204 entropy-decodes the video bitstream. In the case where mb_type of a macroblock is not I_PCM (PCM encoding), the entropy decoder 204 entropy-decodes prediction parameters and a transform quantization value of the macroblock, and supplies them to the inverse transformer/inverse quantizer 206 and the predictor 207.

The inverse transformer/inverse quantizer 206 inverse-quantizes the transform quantization value of luminance and color difference, with a quantization step width according to the pixel bit length increase information increased_bit_depth_luma and increased_bit_depth_chroma extracted by the de-multiplexing. The inverse transformer/inverse quantizer 206 further inverse-frequency-transforms the frequency transform coefficient obtained by the inverse quantization.

The predictor 207 creates a prediction signal using an image of a reconstructed picture stored in the buffer 208, based on the entropy-decoded prediction parameters.

The prediction signal supplied from the predictor 207 is added to the reconstructed prediction error image obtained by the inverse frequency transform by the inverse transformer/inverse quantizer 206, and the resulting image is supplied to the switch 222.

The decoding controller 202 changes the switch 222 so that the reconstructed prediction error image to which the prediction signal has been added is supplied to the buffer 208 as the reconstructed image.

In the case where mb_type of the macroblock is PCM encoding, the decoding controller 202 causes the de-multiplexer 201 to byte-align the video bitstream which is in the middle of entropy decoding. When complying with 7.3.5 Macroblock layer syntax in NPL 2, the decoding controller 202 causes the de-multiplexer 201 to read pcm_alignment_zero_bit until the video bitstream is byte-aligned.

The decoding controller 202 then causes the entropy decoder 204 to initialize a decoding engine. An example of decoding engine initialization is described in 9.3.1.2 Initialization process for the arithmetic decoding engine in NPL 2.

Following this, the decoding controller 202 changes the switch 221 so that the byte-aligned video bitstream is supplied to the PCM decoder 203.

The PCM decoder 203 PCM-decodes (PCM-data-reads) PCM-encoded luminance data pcm_sample_luma[i] and color difference data pcm_sample_chroma[i] from the byte-aligned video bitstream.

The pixel bit length increasing unit 205 shifts PCM-data-read pcm_sample_luma[i] and pcm_sample_chroma[i] to the left, respectively according to the pixel bit length increase information increased_bit_depth_luma and increased_bit_depth_chroma extracted by the de-multiplexing. When complying with the description of 8.3.5 Sample construction process for I_PCM macroblocks in NPL 2, a PCM-decoded luminance image S'L and a PCM-decoded color difference image S'Cb and S'Cr are computed according to Equation (8-154') and Equation (8-155') below.

$$\text{for}(i = 0; i < 256; i++) \quad (8\text{-}154')$$
$$S'L[xP + (i \% 16), yP + dy * (i/16))] =$$
$$(\text{pcm\_sample\_luma}[i] \ll \text{increased\_bit\_depth\_luma})$$

$$\text{for}(i = 0; i < MbWidthC * MbHeightC; i++) \quad (8\text{-}155')$$
$$\{S'Cb[(xP/SubWidthC) + (i \% MbWidthC),$$
$$((yP + SubHeightC - 1)/SubHeightC) +$$
$$dy * (i/MbWidthC)] =$$
$$(\text{pcm\_sample\_chroma}[i] \ll \text{increased\_bit\_depth\_chroma})$$
$$S'Cr[(xP/SubWidthC) + (i \% MbWidthC),$$
$$((yP + SubHeightC - 1)/SubHeightC) +$$
$$dy * (i/MbWidthC)] =$$
$$(\text{pcm\_sample\_chroma}[i + MbWidthC * MbHeightC] \ll$$
$$\text{increased\_bit\_depth\_chroma})\}$$

The decoding controller 202 changes the switch 222 so that the PCM-decoded image increased in pixel bit length is supplied to the buffer 208 as the reconstructed image. The decoding controller 202 changes the switch 221 so that the output data of the de-multiplexer 201 is supplied to the entropy decoder 204, for decoding of a next macroblock.

The pixel bit length decreasing unit 209 decreases the pixel bit length of the reconstructed picture stored in the buffer 208 according to the pixel bit length increase information increased_bit_depth_luma and increased_bit_depth_chroma extracted by the de-multiplexing, and outputs the result.

Based on the operation described above, the video decoding device in this exemplary embodiment creates the decoded image.

Figure 5:
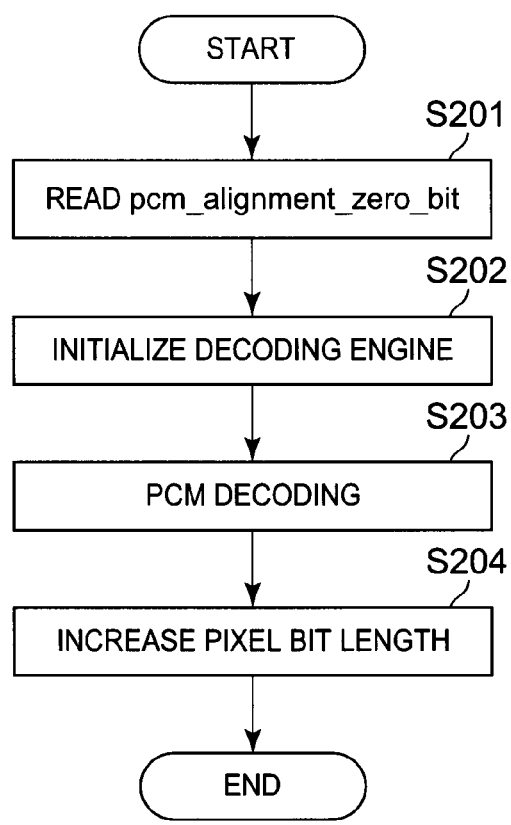
FIG. 5 is a flowchart showing processing of the video decoding device in Exemplary Embodiment 2.

Operations of the decoding controller 202, the entropy decoder 204, the PCM decoder 203, and the pixel bit length increasing unit 205 in the case where mb_type of the macroblock is PCM encoding, which are features of the present invention, are described below with reference to the flowchart in FIG. 5.

In step S201, the de-multiplexer 201 reads pcm_alignment_zero_bit so as to byte-align the video bitstream which is in the middle of entropy decoding.

In step S202, the entropy decoder 204 initializes the decoding engine for subsequent entropy decoding.

In step S203, the PCM decoder 203 PCM-decodes (PCM-data-reads) the PCM encoding result pcm_sample_luma[i] and pcm_sample_chroma[i].

In step S204, the pixel bit length increasing unit 205 shifts PCM-data-read pcm_sample_luma[i] and pcm_sample_chroma[i] to the left respectively by increased_bit_depth_luma bits and increased_bit_depth_chroma bits, in order to enhance operation precision of subsequent intra prediction and inter-frame prediction.

Thus, in the case where mb_type of the macroblock is PCM encoding, the decoding controller 202, the entropy decoder 204, the PCM decoder 203, and the pixel bit length increasing unit 205 operate as described above.

The video decoding device in this exemplary embodiment includes the pixel bit length increasing unit 205 for increasing the pixel bit length of the decoded image of PCM decoding based on the pixel bit length increase information extracted by the de-multiplexing. The pixel bit length increasing unit 205 can suppress reduction of operation precision of intra prediction and inter-frame prediction caused by making the pixel bit lengths of the images corresponding to the inputs of the entropy decoding means and the PCM decoding means different from each other. Moreover, the reconstructed image same as in video decoding can be obtained, which contributes to enhanced interoperability of the video encoding device and the video decoding device. That is, the video encoding device and the video decoding device co-operate with each other, with it being possible to suppress increase of PCM encoding in the system and also suppress reduction of operation precision of intra prediction and inter-frame prediction.

The video encoding device in Exemplary Embodiment 1 shown in FIG. 1 is a video encoding device that supplies the input image before the increase of the pixel bit length to the PCM encoder 107, in order to make the pixel bit length of the image corresponding to the output data of entropy encoding and the pixel bit length of the image corresponding to the output data of PCM encoding different from each other.

Figure 6:
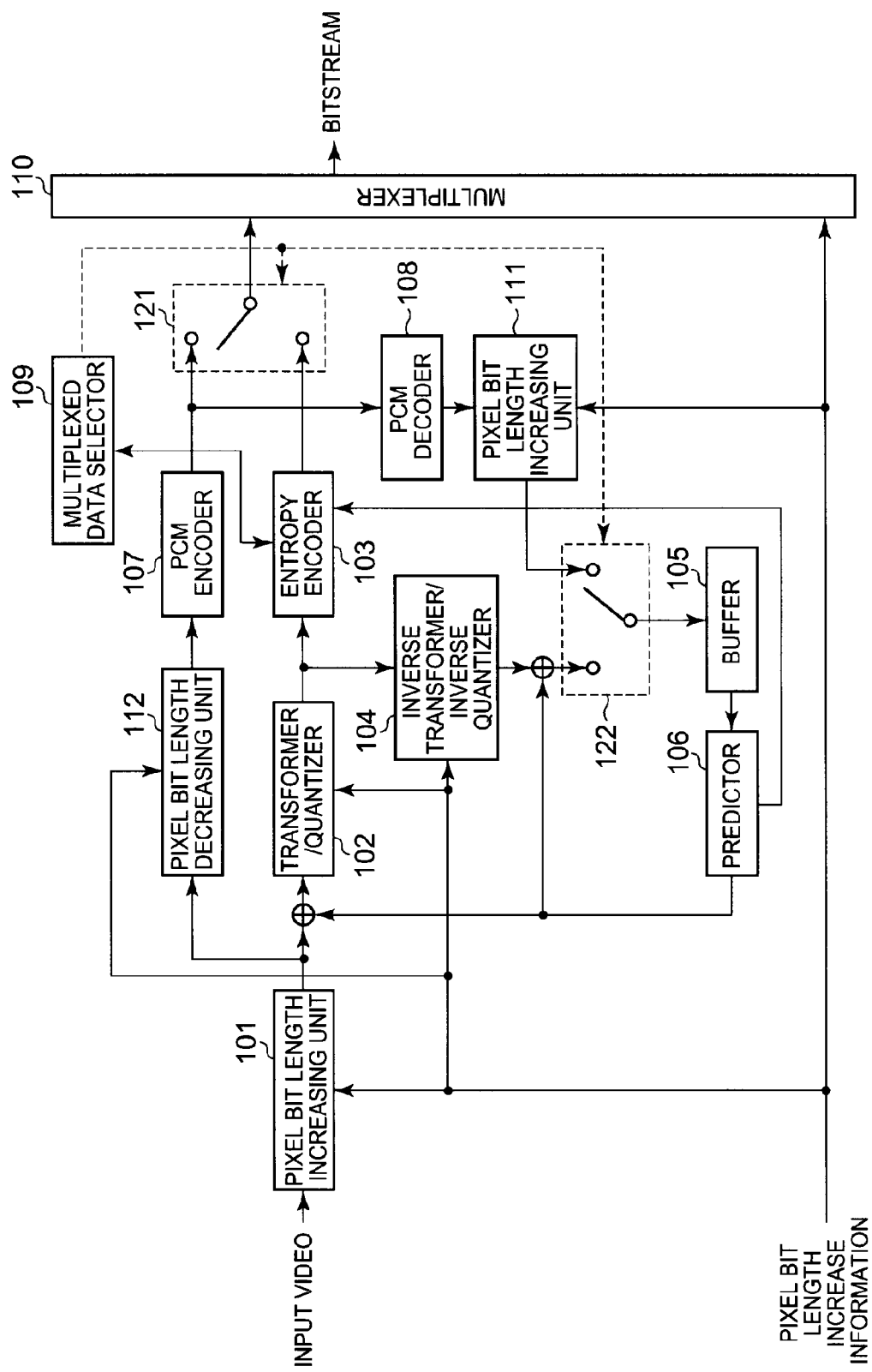
FIG. 6 is a block diagram of a video encoding device in another exemplary embodiment.

FIG. 6 is a block diagram showing a video encoding device of another structure for achieving the same advantageous effects as the video encoding device shown in FIG. 1.

When compared with the video encoding device shown in FIG. 1, the video encoding device shown in FIG. 6 additionally includes a pixel bit length decreasing unit 112. That is, the video encoding device shown in FIG. 6 has a structure in which the pixel bit length decreasing unit 112 that receives the image increased in pixel bit length supplies, to the PCM encoder 107, the image decreased in pixel bit length based on the pixel bit length increase information. As in Exemplary Embodiment 1, the video encoding device shown in FIG. 6 can suppress increase of output data of PCM encoding, and also suppress reduction of operation precision of intra prediction and inter-frame prediction caused by making the pixel bit lengths different from each other.

In each of the exemplary embodiments described above, the pixel of the reconstructed picture is a pixel increased in pixel bit length. For size reduction of the buffer for storing the reconstructed picture, however, an exemplary embodiment in which the above-mentioned pixel bit length increasing unit and pixel bit length decreasing unit are used for input/output of the buffer is also conceivable. In such an exemplary embodiment, too, the suppression of increase of output data of PCM encoding and the suppression of reduction of operation precision of intra prediction caused by making the pixel bit lengths different from each other can both be achieved according to the present invention.

In each of the exemplary embodiments described above, the PCM decoder and the pixel bit length increasing unit are independent functional blocks. As can be easily understood from Equation (8-154') and Equation (8-155'), however, the PCM decoder and the pixel bit length increasing unit may be integrated as one functional block.

In each of the exemplary embodiments described above, the video encoding device multiplexes increased_bit_depth_luma and increased_bit_depth_chroma in the bitstream following bit_depth_luma_minus8 and bit_depth_chroma_minus8, in order to explicitly signal the pixel bit length increase information to the video decoding device (see FIG. 2). Alternatively, the video encoding device may multiplex, as the pixel bit length increase information, pixel bit length information after the increase of the pixel bit length in the bitstream, in order to implicitly signal the pixel bit length increase information to the video decoding device (it is assumed here that the original pixel bit length of the input video is, for example, 8 bits in the video encoding device and the video decoding device).

In this case, the video encoding device multiplexes pixel bit length increase information (internal_bit_depth_luma_minus8 and internal_bit_depth_chroma_minus8) shown in FIG. 7 in the sequence parameters, instead of bit_depth_luma_minus8 and bit_depth_chroma_minus8 of the sequence parameters. Here, internal_bit_depth_luma_minus8 is the value of increased_bit_depth_luma, and internal_bit_depth_chroma_minus8 is the value of increased_bit_depth_chroma.

In the case of multiplexing the pixel bit length increase information shown in FIG. 7 in the sequence parameters, the PCM encoder 107 PCM-encodes the input image before the increase of the pixel bit length. That is, the PCM encoder 107 PCM-encodes 8-bit pcm_sample_luma[i] and pcm_sample_chroma[i]. The PCM decoder 108 PCM-decodes 8-bit pcm_sample_luma[i] and pcm_sample_chroma[i]. The pixel bit length increasing unit 111 shifts PCM-decoded pcm_sample_luma[i] and pcm_sample_chroma[i] to the left respectively by increased_bit_depth_luma bits and increased_bit_depth_chroma bits.

A video decoding device corresponding to the case of multiplexing the pixel bit length increase information shown in FIG. 7 in the sequence parameters de-multiplexes the pixel bit length increase information (internal_bit_depth_luma_minus8 and internal_bit_depth_chroma_minus8) from the sequence parameters, and computes increased_bit_depth_luma and increased_bit_depth_chroma as follows.

increased_bit_depth_luma=internal_bit_depth_luma_minus8 increased_bit_depth_chroma=internal_bit_depth_chroma_minus8

By the above-mentioned computation, the video decoding device can de-multiplex the pixel bit length increase information implicitly signaled by the video encoding device.

In the above-mentioned case where the video encoding device implicitly signals the pixel bit length increase information to the video decoding device, there is a problem that PCM encoding cannot be performed due to non-distortion when the original pixel bit length of the input video is longer than 8 bits. For example, quantization distortion occurs with 8-bit pcm_sample_luma[i] and pcm_sample_chroma[i] when the original pixel bit length of the input video is 10 bits.

To support PCM encoding without quantization distortion when the original pixel bit length of the input video is N bits (N>8), pcm_sample_bit_depth_is_internal_bit_depth_flag which is a flag indicating whether or not the bit length of PCM is the pixel bit length after the pixel bit length increase may be added to the sequence parameters as shown in FIG. 8.

In the case where pcm_sample_bit_depth_is_internal_bit_depth_flag is 0, the PCM encoder 107 PCM-encodes the input image before the increase of the pixel bit length. That is, the PCM encoder 107 PCM-encodes 8-bit pcm_sample_luma[i] and pcm_sample_chroma[i]. The PCM decoder 108 PCM-decodes 8-bit pcm_sample_luma[i] and pcm_sample_chroma[i]. The pixel bit length increasing unit 111 shifts PCM-decoded pcm_sample_luma[i] and pcm_sample_chroma[i] to the left respectively by increased_bit_depth_luma (=internal_bit_depth_luma_minus8) bits and increased_bit_depth_chroma (=internal_bit_depth_chroma_minus8) bits.

In the case where pcm_sample_bit_depth_is_internal_bit_depth_flag is 1, the PCM encoder 107 PCM-encodes the image increased in pixel bit length. That is, the PCM encoder 107 PCM-encodes pcm_sample_luma[i] of N bits (internal_bit_depth_luma_minus8+8 bits) and pcm_sample_chroma[i] of N bits (internal_bit_depth_chroma_minus8+8 bits). The PCM decoder 108 PCM-decodes pcm_sample_luma[i] of N bits and pcm_sample_chroma[i] of N bits. The pixel bit length increasing unit 111 shifts PCM-decoded pcm_sample_luma[i] and pcm_sample_chroma[i] to the left by 0 bit (i.e. does not shift PCM-decoded pcm_sample_luma[i] and pcm_sample_chroma[i] to the left).

To support PCM encoding without quantization distortion when the original pixel bit length of the input video is N bits (N>8), pcm_sample_bit_depth_luma_minus8 and pcm_sample_bit_depth_chroma_minus8 which are respectively the bit lengths of PCM of luminance and color difference may be added to the sequence parameters instead of pcm_sample_bit_depth_is_internal_bit_depth_flag, as shown in FIG. 9.

In the case of adding pcm_sample_bit_depth_luma_minus8 and pcm_sample_bit_depth_chroma_minus8 to the sequence parameters, the PCM encoder 107 PCM-encodes pcm_sample_luma[i] of pcm_sample_bit_depth_luma_minus8+8 bits and pcm_sample_croma[i] of pcm_sample_bit_depth_chroma_minus8+8 bits. In the case of adding pcm_sample_bit_depth_luma_minus8 and pcm_sample_bit_depth_chroma_minus8 to the sequence parameters, the PCM decoder 108 PCM-decodes pcm_sample_luma[i] of pcm_sample_bit_depth_luma_minus8+8 bits and pcm_sample_croma[i] of pcm_sample_bit_depth_chroma_minus8+8 bits. The pixel bit length increasing unit 111 shifts PCM-decoded pcm_sample_luma[i] and pcm_sample_chroma[i] to the left respectively by increased_bit_depth_luma bits and increased_bit_depth_chroma bits. Here, increased_bit_depth_luma and increased_bit_depth_chroma are computed as follows.

increased_bit_depth_luma =
    internal_bit_depth_luma_minus8 − pcm_sample_bit_depth_luma_minus8 increased_bit_depth_chroma = internal_bit_depth_chroma_minus8 −
    pcm_sample_bit_depth_chroma_minus8

It is clear from the above-mentioned computation that the video encoding device implicitly signals the pixel bit length increase information to the video decoding device in the case where increased_bit_depth_luma is more than 0 and also internal_bit_depth_luma_minus8+8 is less than N, and equally the video encoding device implicitly signals the pixel bit length increase information to the video decoding device in the case where internal_bit_depth_chroma_minus8+8 is less than N.

Each of the exemplary embodiments described above may be realized by hardware, or may be realized by a computer program.

Figure 10:
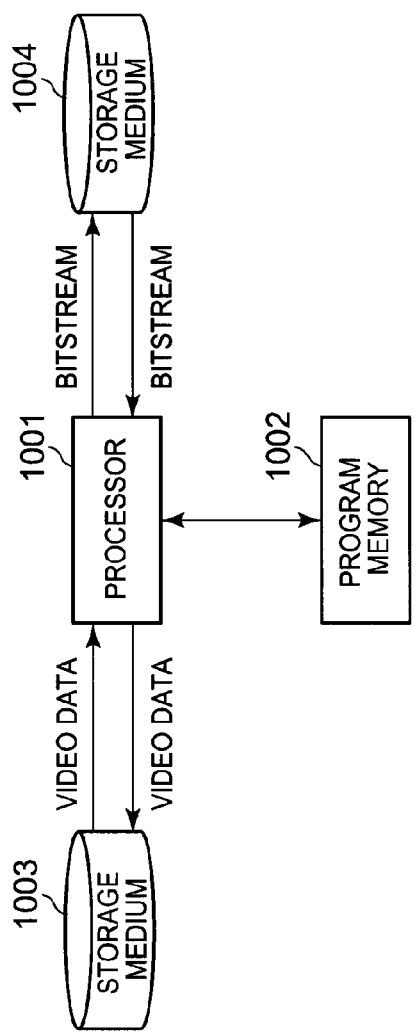
FIG. 10 is a block diagram showing a structural example of an information processing system capable of realizing functions of a video encoding device and a video decoding device according to the present invention.

An information processing system shown in FIG. 10 includes a processor 1001, a program memory 1002, a storage medium 1003 for storing video data, and a storage medium 1004 for storing a bitstream. The storage medium 1003 and the storage medium 1004 may be separate storage media, or may be a storage area composed of the same storage medium. As a storage medium, a magnetic storage medium such as a hard disk is applicable.

In the information processing system shown in FIG. 10, a program for realizing the functions of the blocks (except the block of the buffer) shown in each of FIGS. 1, 4, and 6 is stored in the program memory 1002. The processor 1001 realizes the functions of the video encoding device or the video decoding device shown in FIG. 1, 4, or 6, by executing processing according to the program stored in the program memory 1002.

Figure 11:
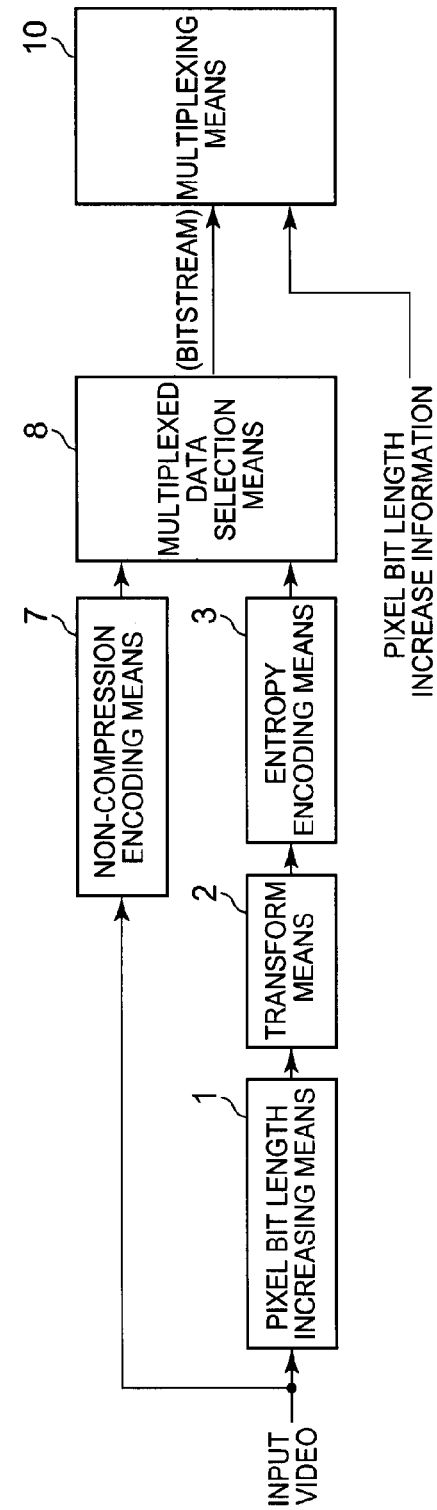
FIG. 11 is a block diagram showing a main part of a video encoding device according to the present invention.

FIG. 11 is a block diagram showing a main part of a video encoding device according to the present invention. As shown in FIG. 11, the video encoding device according to the present invention includes: pixel bit length increasing means 1 (e.g. the pixel bit length increasing unit 101 shown in FIG. 1) for increasing a pixel bit length of an input image based on pixel bit length increase information; transform means 2 (e.g. the transformer/quantizer 102 shown in FIG. 1) for transforming output data of the pixel bit length increasing means 1; entropy encoding means 3 (e.g. the entropy encoder 103 shown in FIG. 1) for entropy-encoding output data of the transform means 2; non-compression encoding means 7 (e.g. the PCM encoder 107) for non-compression-encoding input data; multiplexed data selection means 8 (e.g. the switch 121) for selecting output data of the entropy encoding means 3 or output data of the non-compression encoding means 7; and multiplexing means 10 (e.g. the multiplexer 110) for multiplexing the pixel bit length increase information in a bitstream, wherein a pixel bit length of an image corresponding to the output data of the entropy encoding means 3 and a pixel bit length of an image corresponding to the output data of the non-compression encoding means 7 are different from each other.

To make the pixel bit lengths different from each other, the video encoding device includes, as an example, means for supplying the input image before the increase of the pixel bit length to the non-compression encoding means 7. In such a case, the input image not increased in pixel bit length is non-compression-encoded (e.g. PCM-encoded).

Figure 12:
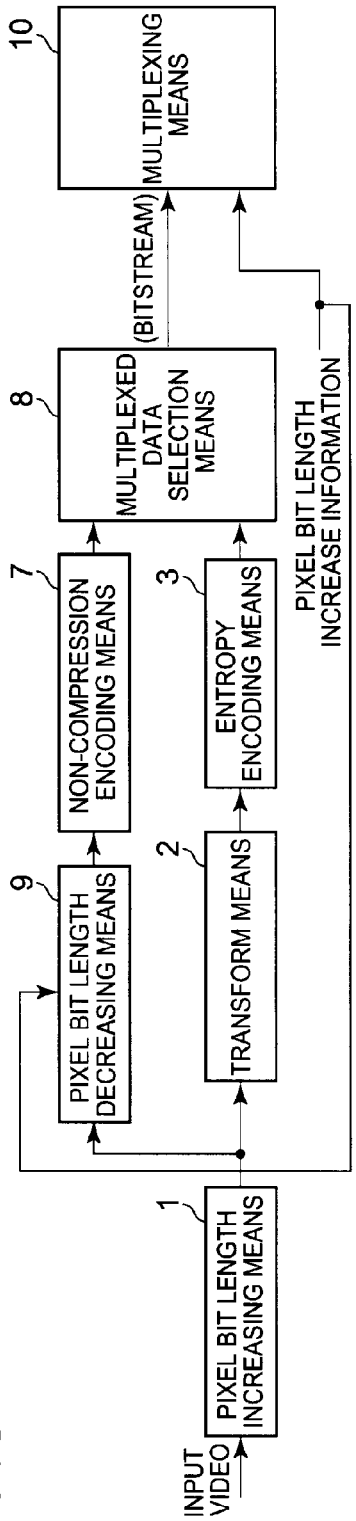
FIG. 12 is a block diagram showing a main part of another video encoding device according to the present invention.

FIG. 12 is a block diagram showing a main part of another video encoding device according to the present invention. As shown in FIG. 12, in addition to the structure shown in FIG. 11, the other video encoding device according to the present invention includes pixel bit length decreasing means 9 (e.g. the pixel bit length decreasing unit 112 shown in FIG. 6) for decreasing a pixel bit length based on the pixel bit length increase information, wherein the input data of the non-compression encoding means 7 is output data of the pixel bit length decreasing means 9.

Figure 13:
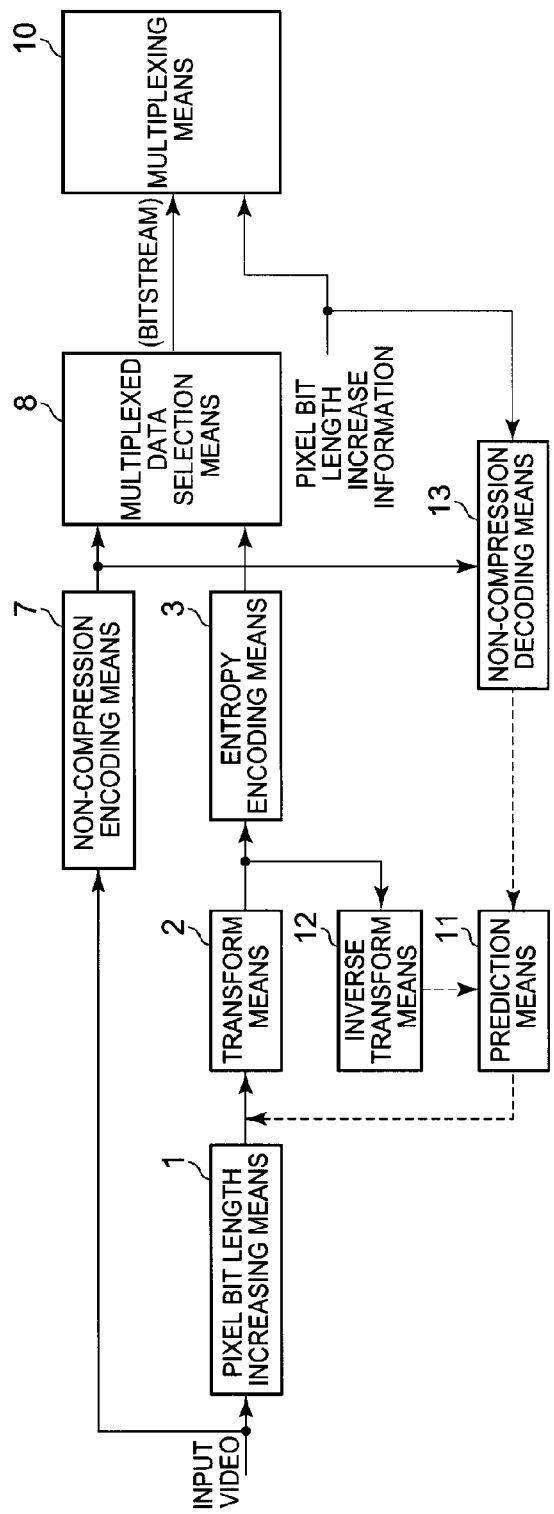
FIG. 13 is a block diagram showing a main part of yet another video encoding device according to the present invention.

FIG. 13 is a block diagram showing a main part of another video encoding device according to the present invention. As shown in FIG. 13, in addition to the structure shown in FIG. 11, the other video encoding device according to the present invention includes: prediction means 10 (e.g. the predictor 106 shown in FIG. 1) for predicting an image;

inverse transform means 12 (e.g. the inverse transformer/inverse quantizer 104 shown in FIG. 1) for inverse-transforming the output data of the transform means 2; and non-compression decoding means 13 (e.g. the PCM decoder 108 shown in FIG. 1) for decoding the output data of the non-compression encoding means 7, wherein the non-compression decoding means 13 increases a pixel bit length of a decoded image obtained by non-compression decoding, based on at least the pixel bit length increase information.

Figure 14:
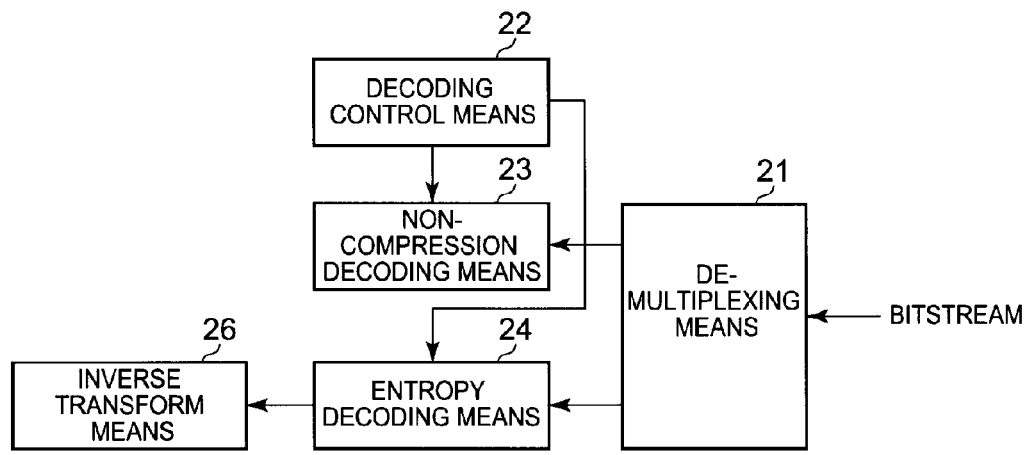
FIG. 14 is a block diagram showing a main part of a video decoding device according to the present invention.

FIG. 14 is a block diagram showing a main part of a video decoding device according to the present invention. As shown in FIG. 14, the video decoding device according to the present invention includes: de-multiplexing means 21 (e.g. the de-multiplexer 201 shown in FIG. 4) for de-multiplexing a bitstream including at least pixel bit length increase information; entropy decoding means 24 (e.g. the entropy decoder 204 shown in FIG. 4) for entropy-decoding transformed data of an image included in the bitstream; inverse transform means 26 (e.g. the inverse transformer/inverse quantizer 206 shown in FIG. 4) for inverse-transforming the entropy-decoded transformed data of the image; non-compression decoding means 23 (e.g. the PCM decoder 203 shown in FIG. 4) for non-compression-decoding non-compression-encoded data of an image included in the bitstream; and decoding control means 22 (e.g. the decoding controller 202 shown in FIG. 4) for controlling the entropy decoding means 24 and the non-compression decoding means 23, wherein a pixel bit length of an image corresponding to input data of the entropy decoding means 24 and a pixel bit length of an image corresponding to input data of the non-compression decoding means 23 are different from each other.

Figure 15:
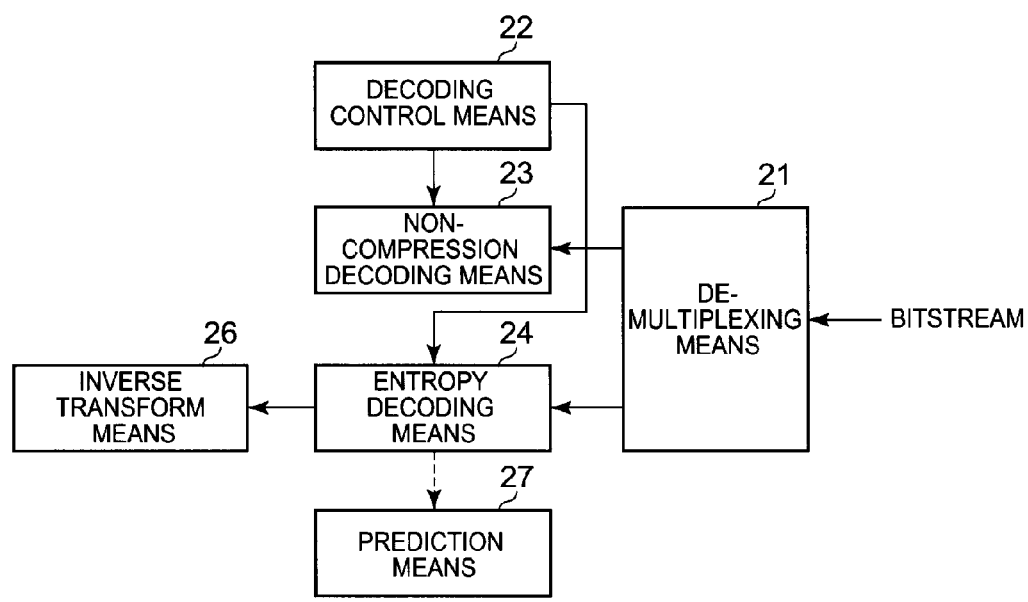
FIG. 15 is a block diagram showing a main part of another video decoding device according to the present invention.

FIG. 15 is a block diagram showing a main part of another video decoding device according to the present invention. As shown in FIG. 15, in addition to the structure shown in FIG. 14, the video decoding device according to the present invention includes prediction means 27 (e.g. the predictor 207 shown in FIG. 4) for predicting an image.

As described above, the present invention provides means for making a pixel bit length of an image corresponding to output data of entropy encoding and a pixel bit length of an image corresponding to output data of non-compression encoding different from each other, in video encoding based on pixel bit length increase and non-compression encoding. The present invention can thus solve a problem that output data of PCM encoding increases by the pixel bit length increase amount, while both enhancing operation precision of intra prediction and inter-frame prediction by pixel bit length extension and guaranteeing a fixed processing time for a video encoding device or a video decoding device.

The exemplary embodiments described above may be partly or wholly described in the following supplementary notes, though the present invention is not limited to the following structures.

(Supplementary Note 1)

A video encoding method including: transforming data obtained by increasing a pixel bit length of an input image based on pixel bit length increase information; entropy-encoding the transformed data; non-compression-encoding input data; selecting the entropy-encoded data or the non-compression-encoded data; and multiplexing the pixel bit length increase information in a bitstream, wherein a pixel bit length of an image corresponding to the entropy-encoded data and a pixel bit length of an image corresponding to the non-compression-encoded data are different from each other, and wherein the input image before the increase of the pixel bit length is used as the input data to be non-compression-encoded.

(Supplementary Note 2)

A video encoding method including: transforming data obtained by increasing a pixel bit length of an input image based on pixel bit length increase information; entropy-encoding the transformed data; non-compression-encoding input data; selecting the entropy-encoded data or the non-compression-encoded data; and multiplexing the pixel bit length increase information in a bitstream, wherein a pixel bit length of an image corresponding to the entropy-encoded data and a pixel bit length of an image corresponding to the non-compression-encoded data are different from each other, wherein the video encoding method includes decreasing a pixel bit length of data increased in pixel bit length, based on the pixel bit length increase information, and wherein the data decreased in pixel bit length is used as the input data to be non-compression-encoded.

(Supplementary Note 3)

A video encoding method including: transforming data obtained by increasing a pixel bit length of an input image based on pixel bit length increase information; entropy-encoding the transformed data; non-compression-encoding input data; selecting the entropy-encoded data or the non-compression-encoded data; and multiplexing the pixel bit length increase information in a bitstream, wherein a pixel bit length of an image corresponding to the entropy-encoded data and a pixel bit length of an image corresponding to the non-compression-encoded data are different from each other, and wherein the video encoding method includes: inverse-transforming the transformed data; decoding the non-compression-encoded data; and, in the decoding, increasing a pixel bit length of a decoded image obtained by non-compression decoding, based on at least the pixel bit length increase information.

(Supplementary Note 4)

A video decoding method including: de-multiplexing a bitstream including at least pixel bit length increase information; entropy-decoding transformed data of an image included in the bitstream; inverse-transforming the entropy-decoded transformed data of the image; and non-compression-decoding non-compression-encoded data of an image included in the bitstream, wherein a pixel bit length of an image corresponding to the transformed data of the image included in the bitstream and a pixel bit length of an image corresponding to the non-compression-encoded data of the image included in the bitstream are different from each other, and wherein the video decoding method includes, in the non-compression decoding, increasing a pixel bit length of a decoded image obtained by the non-compression decoding, based on at least the pixel bit length increase information.

(Supplementary Note 5)

A video decoding method including: de-multiplexing a bitstream including at least pixel bit length increase information; entropy-decoding transformed data of an image included in the bitstream; inverse-transforming the entropy-decoded transformed data of the image; and non-compression-decoding non-compression-encoded data of an image included in the bitstream, wherein a pixel bit length of an image corresponding to the transformed data of the image included in the bitstream and a pixel bit length of an image corresponding to the non-compression-encoded data of the image included in the bitstream are different from each other, and wherein the video decoding method includes executing a prediction process of predicting an image.

(Supplementary Note 6)

A video encoding program for causing a computer to execute: a process of transforming data obtained by increasing a pixel bit length of an input image based on pixel bit length increase information; a process of entropy-encoding the transformed data; a process of non-compression-encoding input data; a process of selecting the entropy-encoded data or the non-compression-encoded data; and a process of multiplexing the pixel bit length increase information in a bitstream, wherein a pixel bit length of an image corresponding to the entropy-encoded data and a pixel bit length of an image corresponding to the non-compression-encoded data are different from each other, and wherein the input image before the increase of the pixel bit length is used as the input data to be non-compression-encoded.

(Supplementary Note 7)

A video encoding program for causing a computer to execute: a process of transforming data obtained by increasing a pixel bit length of an input image based on pixel bit length increase information; a process of entropy-encoding the transformed data; a process of non-compression-encoding input data; a process of selecting the entropy-encoded data or the non-compression-encoded data; and a process of multiplexing the pixel bit length increase information in a bitstream, wherein a pixel bit length of an image corresponding to the entropy-encoded data and a pixel bit length of an image corresponding to the non-compression-encoded data are different from each other, wherein the video encoding program causes the computer to execute a process of decreasing a pixel bit length of data increased in pixel bit length, based on the pixel bit length increase information, and wherein the data decreased in pixel bit length is used as the input data to be non-compression-encoded.

(Supplementary Note 8)

A video encoding program for causing a computer to execute: a process of transforming data obtained by increasing a pixel bit length of an input image based on pixel bit length increase information; a process of entropy-encoding the transformed data; a process of non-compression-encoding input data; a process of selecting the entropy-encoded data or the non-compression-encoded data; and a process of multiplexing the pixel bit length increase information in a bitstream, wherein a pixel bit length of an image corresponding to the entropy-encoded data and a pixel bit length of an image corresponding to the non-compression-encoded data are different from each other, and wherein the video encoding program causes the computer to execute: a process of inverse-transforming the transformed data; a process of decoding the non-compression-encoded data; and a process of, in the decoding, increasing a pixel bit length of a decoded image obtained by non-compression decoding, based on at least the pixel bit length increase information.

(Supplementary Note 9)

A Video Decoding Program for Causing a Computer to execute: a process of de-multiplexing a bitstream including at least pixel bit length increase information; a process of entropy-decoding transformed data of an image included in the bitstream; a process of inverse-transforming the entropy-decoded transformed data of the image; and a process of non-compression-decoding non-compression-encoded data of an image included in the bitstream, wherein a pixel bit length of an image corresponding to the transformed data of the image included in the bitstream and a pixel bit length of an image corresponding to the non-compression-encoded data of the image included in the bitstream are different from each other, and wherein the video decoding program causes the computer to execute a process of, in the non-compression decoding, increasing a pixel bit length of a decoded image obtained by the non-compression decoding, based on at least the pixel bit length increase information.

(Supplementary Note 10)

A video decoding program for causing a computer to execute: a process of de-multiplexing a bitstream including at least pixel bit length increase information; a process of entropy-decoding transformed data of an image included in the bitstream; a process of inverse-transforming the entropy-decoded transformed data of the image; and a process of non-compression-decoding non-compression-encoded data of an image included in the bitstream, wherein a pixel bit length of an image corresponding to the transformed data of the image included in the bitstream and a pixel bit length of an image corresponding to the non-compression-encoded data of the image included in the bitstream are different from each other, and wherein the video decoding program causes the computer to execute a prediction process of predicting an image.

Though the present invention has been described with reference to the above exemplary embodiments and examples, the present invention is not limited to the above exemplary embodiments and examples. Various changes understandable by those skilled in the art within the scope of the present invention can be made to the structures and details of the present invention.

This application claims priority based on Japanese Patent Application No. 2010-159059 filed on Jul. 13, 2010 and Japanese Patent Application No. 2011-040530 filed on Feb. 25, 2011, the disclosures of which are incorporated herein in their entirety.

REFERENCE SIGNS LIST 1 pixel bit length increasing means
2 transform means
3 entropy encoding means
7 non-compression encoding means
8 multiplexed data selection means
9 pixel bit length decreasing means
10 multiplexing means
11 prediction means
12 inverse transform means
13 non-compression decoding means
21 de-multiplexing means
22 decoding control means
23 non-compression decoding means
24 entropy decoding means
26 inverse transform means
27 prediction means
101 pixel bit length increasing unit
102 transformer/quantizer
103 entropy encoder
104 inverse transformer/inverse quantizer
105 buffer
106 predictor
107 PCM encoder
108 PCM decoder
109 multiplexed data selector
110 multiplexer
111 pixel bit length increasing unit
112 pixel bit length decreasing unit
121 switch
122 switch
201 de-multiplexer
202 decoding controller
203 PCM decoder 204 entropy decoder
205 pixel bit length increasing unit
206 inverse transformer/inverse quantizer
207 predictor
208 buffer
209 pixel bit length decreasing unit
221 switch
222 switch
1001 processor
1002 program memory
1003 storage medium
1004 storage medium

The invention claimed is:

1. A video decoding device comprising:
a de-multiplexer configured to de-multiplex a bitstream including at least information indicating a bit length of an image encoded by entropy encoding and information indicating a bit length of an image encoded by non-compression encoding;
an entropy decoder configured to entropy-decode transformed data of an image included in the bitstream;
an inverse transformer configured to inverse-transform the entropy-decoded transformed data of the image;
a non-compression decoder configured to non-compression-decode non-compression-encoded data of an image included in the bitstream; and
a decoding controller configured to control the entropy decoder and the non-compression decoder,
wherein the non-compression decoder increases a pixel bit length of the image corresponding to the input data of the non-compression decoder, based on difference between the bit length of the image encoded by entropy encoding and the bit length of the image encoded by non-compression encoding.

2. The video decoding device according to claim 1, further comprising a predictor configured to predict an image.

3. A video decoding method performed by at least one processor, the video decoding method comprising:
de-multiplexing, by the at least one processor, a bitstream including at least information indicating a bit length of an image encoded by entropy encoding and information indicating a bit length of an image encoded by non-compression encoding;
entropy-decoding, by the at least one processor, transformed data of an image included in the bitstream;
inverse-transforming, by the at least one processor, the entropy-decoded transformed data of the image; and
non-compression-decoding, by the at least one processor, non-compression-encoded data of an image included in the bitstream,
wherein a pixel bit length of an image corresponding to the input data of entropy decoding is increased, based on difference between the bit length of the image encoded by entropy encoding and the bit length of the image encoded by the non-compression encoding.

4. A non-transitory computer readable information recording medium storing a video decoding program that, when executed by a processor, instructs the processor to perform:
de-multiplexing a bitstream including at least information indicating a bit length of an image encoded by entropy encoding and information indicating a bit length of an image encoded by non-compression encoding;
entropy-decoding transformed data of an image included in the bitstream;
inverse-transforming the entropy-decoded transformed data of the image; and
non-compression-decoding non-compression-encoded data of an image included in the bitstream,
wherein a pixel bit length of an image corresponding to the input data of entropy decoding is increased, based on difference between the bit length of the image encoded by entropy encoding and the bit length of the image encoded by the non-compression encoding.

* * * * *

UNITED STATES PATENT AND TRADEMARK OFFICE
CERTIFICATE OF CORRECTION

| | |
|---|---|
| PATENT NO. | : 9,532,073 B2 |
| APPLICATION NO. | : 14/931181 |
| DATED | : December 27, 2016 |
| INVENTOR(S) | : Keiichi Chono et al. |

It is certified that error appears in the above-identified patent and that said Letters Patent is hereby corrected as shown below:

On the Title Page

Title (54), Line 2:
"DECODING" at the end of Line 2 is replaced with --ENCODING--;

In the Specification

Column 1, Line 2:
"DECODING" at the end of Line 2 is replaced with --ENCODING--;

Column 16, Line 66:
"10" has been replaced with --11--.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*